United States Patent
Kawabe

(10) Patent No.: US 11,210,506 B2
(45) Date of Patent: Dec. 28, 2021

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Chihiro Kawabe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 92 days.

(21) Appl. No.: 16/659,676

(22) Filed: Oct. 22, 2019

(65) Prior Publication Data
US 2020/0364449 A1 Nov. 19, 2020

(30) Foreign Application Priority Data

May 13, 2019 (JP) .............................. JP2019-090904

(51) Int. Cl.
*G06K 9/00* (2006.01)

(52) U.S. Cl.
CPC ..... *G06K 9/00449* (2013.01); *G06K 2209/01* (2013.01)

(58) Field of Classification Search
CPC ..... G06K 2209/01–15; G06K 9/00442–00483
See application file for complete search history.

(56) References Cited

U.S. PATENT DOCUMENTS

| | | | |
|---|---|---|---|
| 2005/0108625 A1* | 5/2005 | Bhogal | G06Q 10/10 715/221 |
| 2006/0159345 A1* | 7/2006 | Clary | G06K 9/2063 382/186 |
| 2016/0012315 A1* | 1/2016 | Perrin | G06K 9/2063 382/161 |
| 2016/0292505 A1* | 10/2016 | Agrawal | G06K 9/00469 |
| 2019/0043146 A1* | 2/2019 | Bliwas | G06K 9/00456 |
| 2019/0197306 A1* | 6/2019 | Ho | G06F 40/174 |

FOREIGN PATENT DOCUMENTS

JP 2005-18678 A 1/2005

* cited by examiner

*Primary Examiner* — Sean T Motsinger
(74) *Attorney, Agent, or Firm* — Oliff PLC

(57) ABSTRACT

An information processing apparatus includes first and second display controllers and a receiver. The first display controller performs control to display a first character recognition result. The first character recognition result is a character recognition result of a first element. The first element and a second element have a specific dependency relationship and are included in a form. The receiver receives a checking/correcting result of checking and/or correcting the first character recognition result. The second display controller performs control to display information that the checking/correcting result and a second character recognition result, which is a character recognition result of the second element, do not satisfy the dependency relationship if the checking/correcting result and the second character recognition result do not satisfy the dependency relationship.

9 Claims, 18 Drawing Sheets

| PRODUCTS_TABLE | | | |
|---|---|---|---|
| ID | NUMBER | NAME | UNIT PRICE |
| 001 | A001 | PRODUCT 001 | 1480 |
| 002 | A002 | PRODUCT 002 | 980 |
| ... | ... | | |
| 043 | A043 | PRODUCT 043 | 1080 |

File (F)  Edit (E)  View (V)  Test (T)  Help (H)

Project 'Prj1'
└ Application form_1
   ├ Form classification
   ├ Positional adjustment (lines)
   └ Recognized frame
      └ A001 number

| Form classification | Positional adjustment (lines) | Recognized frame |

31 →

| Number | Name | Unit price | Quantity | Sub-total |
|---|---|---|---|---|
| A001 | Product 001 | 1,480 | | |
| A002 | Product 002 | 980 | | |
| A003 | Product 003 | 1,480 | | |
| A004 | Product 004 | 950 | | |
| A005 | Product 005 | 980 | | |
| A006 | Product 006 | 880 | | |
| A007 | Product 007 | 950 | | |

30

32 →

| | |
|---|---|
| Name | A001 number |
| Format | One-line character-string frame |
| Machine learning module name | Alphanumeric characters |
| Collation type | Option |
| Reference | Select recognized frame |
| Column | [PRODUCTS_TABLE].[Number] [See DB] |
| Value (primary key) | 001 [See DB] |
| Load | TRUE |
| Expression | |
| Coordinates | xxx,xxx |
| Size | xxx,xxx |

FIG. 5

File (F)  Edit (E)  View (V)  Test (T)  Help (H)

Project 'Prj1'
- Application form_1
  - Form classification
  - Positional adjustment (lines)
  - Recognized frame
    - A001 unit price

| Form classification | Positional adjustment (lines) | Recognized frame |

30

31

| Number | Name | Unit price | Quantity | Sub-total |
|---|---|---|---|---|
| A001 | Product 001 | 1,480 | | |
| A002 | Product 002 | 980 | | |
| A003 | Product 003 | 1,480 | | |
| A004 | Product 004 | 950 | | |
| A005 | Product 005 | 980 | | |
| A006 | Product 006 | 880 | | |
| A007 | Product 007 | 950 | | |

32

| | |
|---|---|
| Name | A001 unit price |
| Format | One-line character-string frame |
| Machine learning module name | Numeric characters |
| Collation type | Automatic |
| Reference (Select recognized frame) | A001 number |
| Column (See DB) | [PRODUCTS_TABLE].[unit price] |
| Value (primary key) (See DB) | 001 |
| Load | TRUE |
| Expression | |
| Coordinates | xxx, xxx |
| Size | xxx, xxx |

FIG. 8A

FORM_TABLE

| ID | NUMBER | NAME |
|---|---|---|
| 001 | F001 | RECOMMENDED PRODUCT APPLICATION FORM |

ELEMENT_TABLE

| ID | NUMBER | FORM ID | NAME | FORMAT | COLLATION TYPE | EXPRESSION | MACHINE LEARNING MODULE NAME | LOAD | VALUE (PRIMARY KEY) | COLUMN | COORDINATES | SIZE |
|---|---|---|---|---|---|---|---|---|---|---|---|---|
| 001 | E001 | F001 | A001 NUMBER | ONE-LINE CHARACTER-STRING FRAME | OPTION | | ALPHANUMERIC CHARACTERS | TRUE | 001 | [PRODUCTS_TABLE]. [Number] | ... | ... |
| 002 | E002 | F001 | A001 NAME | ONE-LINE CHARACTER-STRING FRAME | AUTOMATIC | | GENERAL_PRINTING-CHARACTERS | TRUE | 001 | [PRODUCTS_TABLE]. [Name] | ... | ... |
| 003 | E003 | F001 | A001 UNIT PRICE | ONE-LINE CHARACTER-STRING FRAME | AUTOMATIC | | NUMERIC CHARACTERS | TRUE | 001 | [PRODUCTS_TABLE]. [Unit price] | ... | ... |
| 004 | E004 | F001 | A001 QUANTITY | ONE-LINE CHARACTER-STRING FRAME | INPUT | | NUMERIC CHARACTERS | FALSE | | | ... | ... |
| 005 | E005 | F001 | A001 SUB-TOTAL | ONE-LINE CHARACTER-STRING FRAME | CALCULATE | E003 * E004 | NUMERIC CHARACTERS | FALSE | | | ... | ... |

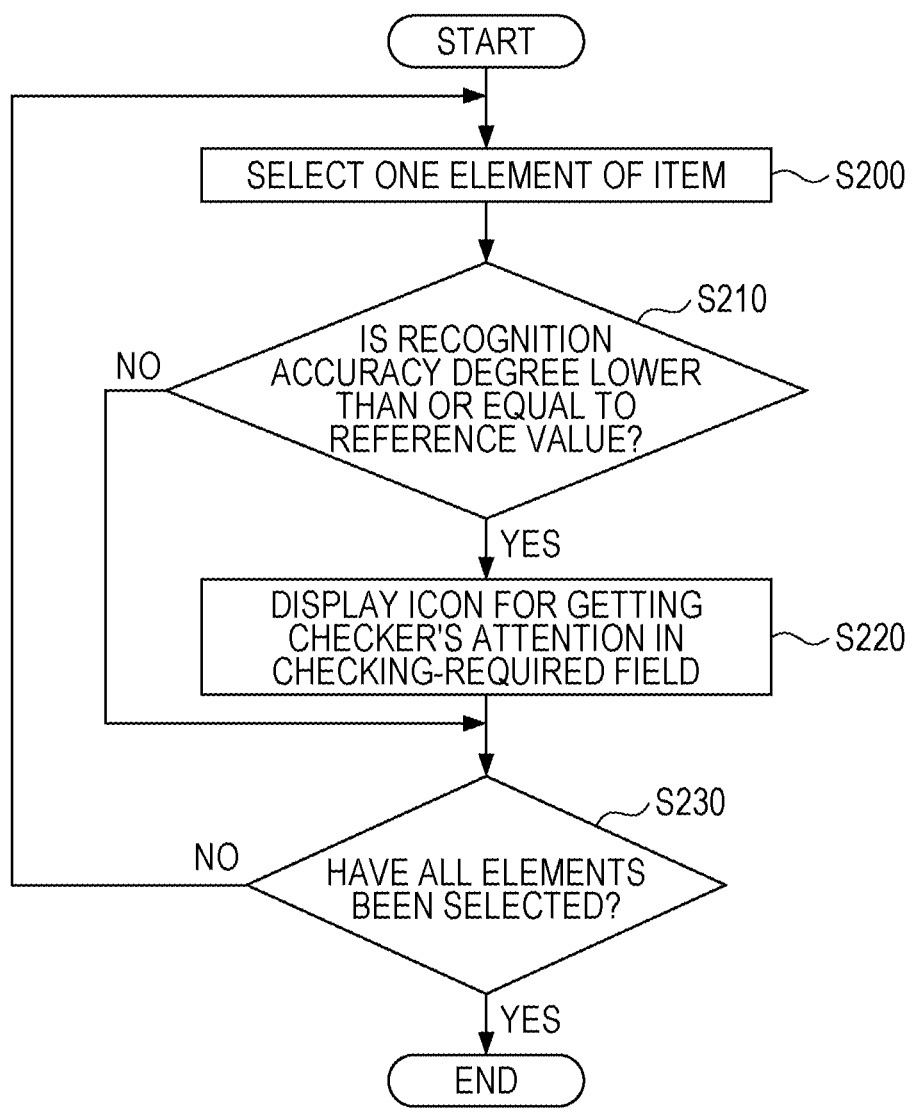

FIG. 13

| Number | Name | Unit price | Quantity | Sub-total |
|---|---|---|---|---|
| A001 | Product 001 | 1,480 | 2 | 2,960 |
| A002 | Product 002 | 980 | | |
| A003 | Product 003 | 1,480 | | |
| A004 | Product 004 | 950 | 1 | 950 |
| A005 | Product 005 | 980 | | |
| A006 | Product 006 | 880 | 1 | |
| A007 | Product 007 | 950 | | |
| A008 | Product 008 | 840 | | |
| A009 | Product 009 | 1,100 | | |
| A010 | Product 010 | 1,060 | | |
| A011 | Product 011 | 920 | | |
| A012 | Product 012 | 980 | | |
| A013 | Product 013 | 950 | | |
| A014 | Product 014 | 840 | | |
| A015 | Product 015 | 950 | | |
| A016 | Product 016 | 980 | | |
| A017 | Product 017 | 980 | | |
| A018 | Product 018 | 990 | | |
| A019 | Product 019 | 1,060 | | |
| A020 | Product 020 | 1,050 | | |
| A021 | Product 021 | 1,480 | | |
| A022 | Product 022 | 1,380 | | |

| Number | Name | Unit price | Quantity | Sub-total |
|---|---|---|---|---|
| A023 | Product 023 | 910 | | |
| A024 | Product 024 | 1,280 | | |
| A025 | Product 025 | 680 | | |
| A026 | Product 026 | 840 | | |
| A027 | Product 027 | 1,040 | | |
| A028 | Product 028 | 1,200 | | |
| A029 | Product 029 | 950 | | |
| A030 | Product 030 | 950 | | |
| A031 | Product 031 | 1,180 | | |
| A032 | Product 032 | 980 | | |
| A033 | Product 033 | 980 | | |
| A034 | Product 034 | 1,580 | | |
| A035 | Product 035 | 1,380 | | |
| A036 | Product 036 | 1,980 | | |
| A037 | Product 037 | 1,980 | | |
| A038 | Product 038 | 1,980 | | |
| A039 | Product 039 | 980 | | |
| A040 | Product 040 | 1,250 | | |
| A041 | Product 041 | 1,110 | | |
| A042 | Product 042 | 1,940 | | |
| A043 | Product 043 | 1,080 | | |
| | Total | | | 3,810 |

| Option | Automatic | Input | Calculate |
|---|---|---|---|

| Name | Scanned image/recognition result | Checking required | Checked |
|---|---|---|---|
| A001 quantity | 2 | | ☐ |
| A004 quantity | 1 | ⚠ | ☐ |
| A006 quantity | 1 | | ☐ |

Entire display  Page:1/1  All elements  OK  Cancel

FIG. 15

| Number | Name | Unit price | Quantity | Sub-total |
|---|---|---|---|---|
| A001 | Product 001 | 1,480 | 2 | 2860 |
| A002 | Product 002 | 980 | | |
| A003 | Product 003 | 1,480 | | |
| A004 | Product 004 | 950 | 1 | 950 |
| A005 | Product 005 | 980 | | |
| A006 | Product 006 | 880 | 1 | |
| A007 | Product 007 | 950 | | |
| A008 | Product 008 | 840 | | |
| A009 | Product 009 | 1,100 | | |
| A010 | Product 010 | 1,060 | | |
| A011 | Product 011 | 920 | | |
| A012 | Product 012 | 980 | | |
| A013 | Product 013 | 950 | | |
| A014 | Product 014 | 840 | | |
| A015 | Product 015 | 950 | | |
| A016 | Product 016 | 980 | | |
| A017 | Product 017 | 980 | | |
| A018 | Product 018 | 990 | | |
| A019 | Product 019 | 1,060 | | |
| A020 | Product 020 | 1,050 | | |
| A021 | Product 021 | 1,480 | | |
| A022 | Product 022 | 1,380 | | |

| Number | Name | Unit price | Quantity | Sub-total |
|---|---|---|---|---|
| A023 | Product 023 | 910 | | |
| A024 | Product 024 | 1,280 | | |
| A025 | Product 025 | 680 | | |
| A026 | Product 026 | 840 | | |
| A027 | Product 027 | 1,040 | | |
| A028 | Product 028 | 1,200 | | |
| A029 | Product 029 | 950 | | |
| A030 | Product 030 | 950 | | |
| A031 | Product 031 | 1,180 | | |
| A032 | Product 032 | 980 | | |
| A033 | Product 033 | 980 | | |
| A034 | Product 034 | 1,580 | | |
| A035 | Product 035 | 1,380 | | |
| A036 | Product 036 | 1,980 | | |
| A037 | Product 037 | 1,980 | | |
| A038 | Product 038 | 980 | | |
| A039 | Product 039 | 980 | | |
| A040 | Product 040 | 1,250 | | |
| A041 | Product 041 | 1,110 | | |
| A042 | Product 042 | 1,940 | | |
| A043 | Product 043 | 1080 | | |
| | Total | | | 3810 |

| Option | Automatic | Input | Calculate |
|---|---|---|---|

| Name | Scanned image/recognition result | Checking required | Checked |
|---|---|---|---|
| A001 sub-total | 2860 / 2860 | | ☐ |
| ⚠ User may have input a wrong value. | | Execute automatic calculation | |
| A004 sub-total | 950 / 750 | ⚠ | ☐ |
| ⚠ Recognition result may be wrong. | | Execute automatic calculation | |
| A006 sub-total | ▢ | ⚠ | ☐ |
| ⚠ User may have forgotten to input a value. | | | |
| Total | 3810 / 3810 | Display details | |

All elements ▼    OK    Cancel

Entire display ▼    🔍 🔍    ▼ ▲  Page:1/1  1/1

FIG. 17

Details display

| A006 unit price | × | A006 quantity | = | A006 sub-total |

Image: 880 | × | 1 | = | (empty box)

Checking/correcting result: 880 | × | 1 | = | 880 (59)

57, 58

Do you want to use this value as checking and correcting result?

[ OK ]  [ Cancel ]

Figure 18:
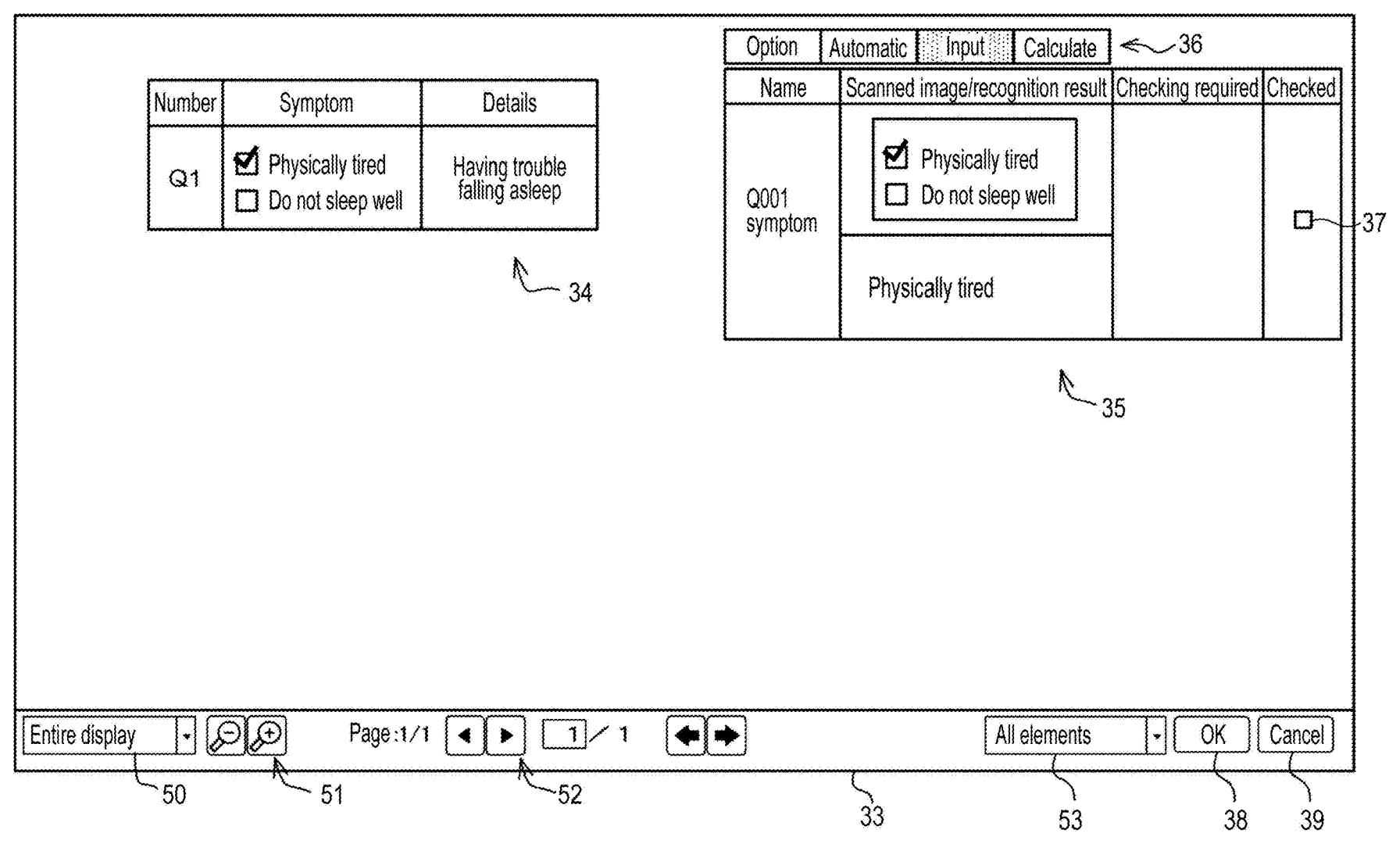

| Number | Symptom | Details |
|---|---|---|
| Q1 | ☑ Physically tired<br>☐ Do not sleep well | Having trouble<br>falling asleep |

34

| Option | Name | Scanned image/recognition result | Checking required | Checked |
|---|---|---|---|---|
| Automatic Input Calculate | Q001 symptom | ☑ Physically tired<br>☐ Do not sleep well<br>Physically tired | | ☐ |

36

35

37

OK 38

Cancel 39

All elements 53

33

Page:1/1  1/1  52

51

Entire display 50

FIG. 19

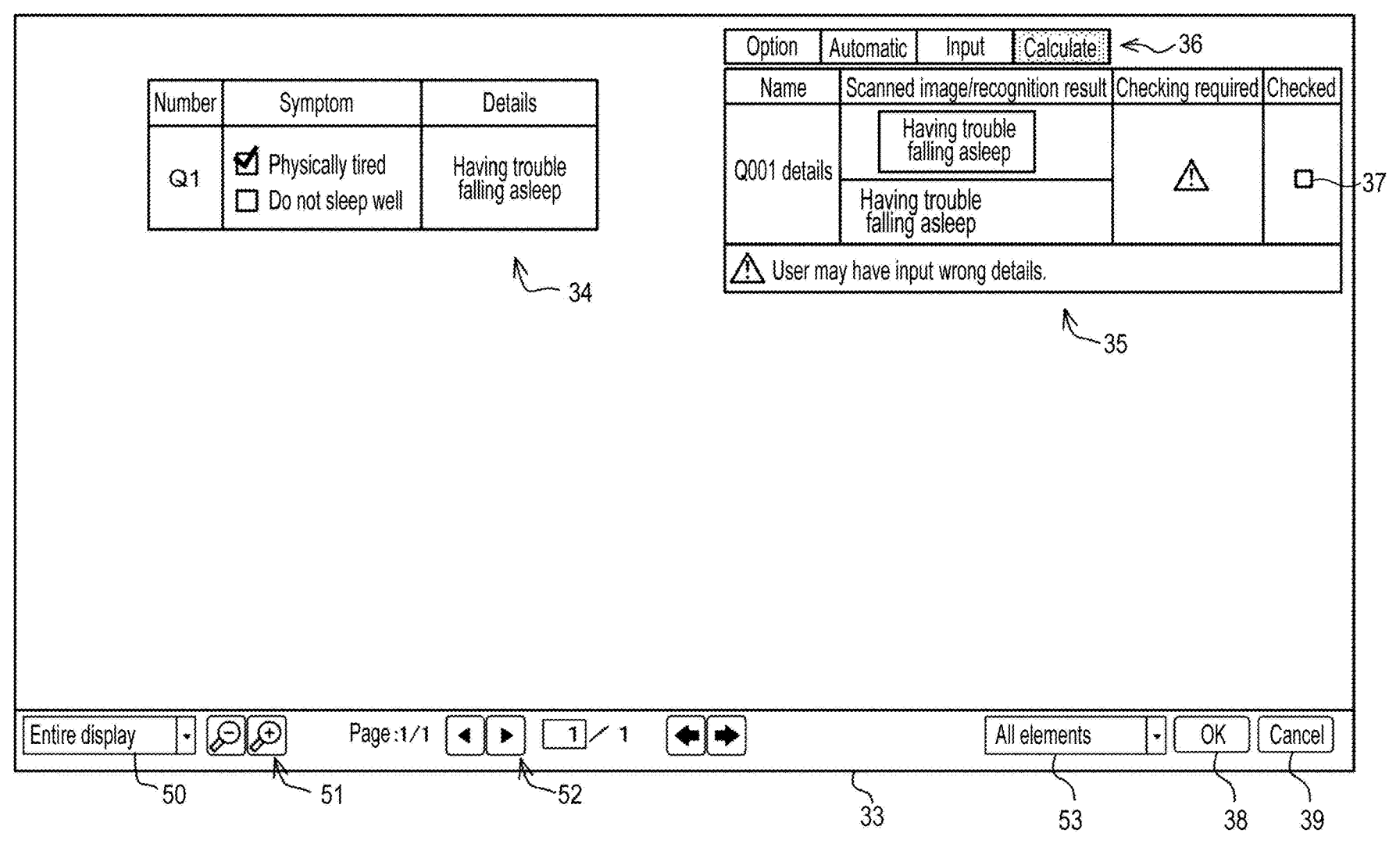

| Number | Symptom | Details |
|---|---|---|
| Q1 | ☑ Physically tired<br>☐ Do not sleep well | Having trouble falling asleep |

↙ 34

| Option | Name | Scanned image/recognition result | Automatic Input Calculate | Checking required | Checked |
|---|---|---|---|---|---|
| | Q001 details | Having trouble falling asleep | Having trouble falling asleep | △ | ☐ |

↖ 36

↙ 35

⚠ User may have input wrong details.

37 ↗

Cancel — 39
OK — 38
All elements — 53

33

1/1 — 52
Page:1/1 — 51
Entire display — 50

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-090904 filed May 13, 2019.

BACKGROUND

(i) Technical Field

The present disclosure relates to an information processing apparatus and a non-transitory computer readable medium.

(ii) Related Art

A system is available in which a checker checks the character recognition result of a form, corrects it if necessary, and outputs a checking/correcting result as the character recognition result of the form.

Forms that can be read by an information processing apparatus have various types of formats. In one type of format, a first element and a second element in a form have a dependency relationship. For example, an order sheet for a product having a fixed price has a quantity field in which the quantity of this product is input and a sub-total field in which the sub-total price of this product is input. The quantity and the sub-total of the product in the order sheet have a dependency relationship because the content of one element is changed in accordance with that of the other element.

Japanese Unexamined Patent Application Publication No. 2005-18678 discloses the following form data input processing apparatus. The form data input processing apparatus performs calculation according to a calculation expression by using the character recognition result of an element of a form which corresponds to a variable in the expression. The form data input processing apparatus then compares the obtained calculation result with the character recognition result of an element concerning the calculation result value. If the two recognition results do not match, the form data input processing apparatus changes the background color of a corresponding portion of this element.

SUMMARY

However, the character recognition result of the element corresponding to the variable is not yet checked or corrected by a checker and may be wrong. If calculation is performed by using this character recognition result, it is highly likely that the calculation result does not match the character recognition result of the element concerning the calculation result value. It is difficult for the checker to determine whether the character recognition result of the element corresponding to the variable is wrong or the character recognition result of the element concerning the recognition result value is wrong.

In such a situation, it is difficult for a checker of this form to identify which element of the character recognition result is wrong, thereby making the checking/correcting operation complicated.

Aspects of non-limiting embodiments of the present disclosure relate to an information processing apparatus and a non-transitory computer readable medium which perform character recognition of a form including first and second elements having a dependency relationship and which are able to reduce the time and effort for a checker to check and correct the character recognition results of the first and second elements, compared with the configuration in which the character recognition result of the second element is presented to a checker without using the checking/correcting result of the first element.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including first and second display controllers and a receiver. The first display controller performs control to display a first character recognition result. The first character recognition result is a character recognition result of a first element. The first element and a second element have a specific dependency relationship and are included in a form. The receiver receives a checking/correcting result of checking and/or correcting the first character recognition result. The second display controller performs control to display information that the checking/correcting result and a second character recognition result, which is a character recognition result of the second element, do not satisfy the dependency relationship if the checking/correcting result and the second character recognition result do not satisfy the dependency relationship.

BRIEF DESCRIPTION OF THE DRAWINGS

An exemplary embodiment of the present disclosure will be described in detail based on the following figures, wherein:

FIG. 4 illustrates an example of a form designing screen displayed when the product number is selected;

FIG. 5 illustrates an example of a form designing screen displayed when the product price is selected;

FIGS. 8A and 8B illustrate an example of form definition data;

FIG. 11 illustrates an example of a checking/correcting screen concerning the product number;

FIG. 12 is a flowchart illustrating an example of display processing;

FIG. 13 illustrates an example of a checking/correcting screen concerning the product quantity;

FIG. 15 illustrates an example of a checking/correcting screen concerning the product sub-total;

FIG. 17 illustrates an example of a details screen;

FIG. 18 illustrates an example of a checking/correcting screen concerning a medical interview sheet; and FIG. 19 illustrates an example of a suggestion made on a checking/correcting screen concerning a medical interview sheet.

DETAILED DESCRIPTION

Figure 1:
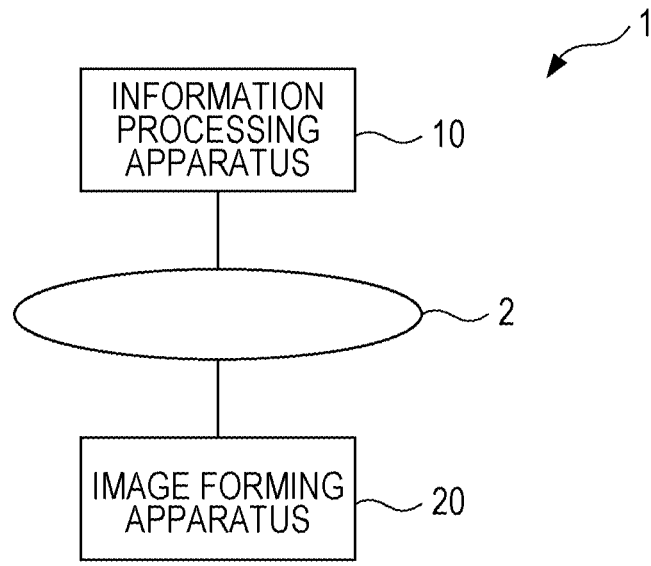
FIG. 1 is a schematic diagram illustrating an example of the system configuration of an information processing system.

An exemplary embodiment of the disclosure will be described below with reference to the accompanying drawings. Components having the same functions are designated by like reference numeral in the drawings and an explanation thereof will not be repeated. Operations having the same functions are designated by like step number in the drawings and an explanation thereof will not be repeated.

FIG. 1 is a schematic diagram illustrating an example of the system configuration of an information processing system 1 that executes processing concerning forms. The information processing system 1 includes an information processing apparatus 10 and an image forming apparatus 20 connected to each other via a communication network 2.

Upon receiving an instruction to create a form, the information processing apparatus 10 generates form definition data in accordance with the format and the items of a form. The form definition data is used for printing a form and for checking and correcting the content filled in a printed form by a user. Upon receiving an instruction to print a form, the information processing apparatus 10 causes the image forming apparatus 20 to print the form on a recording medium, such as a sheet, by using the created form definition data.

A form is a document on which information concerning a specific issue is recorded in accordance with a predetermined format. The form includes blank elements to be filled out by a user. A user may fill in blank elements by hand or by printing using a printer. The content of information recorded on a form is not restricted to a particular type. Various types of documents including blank elements to be filled in by a user, such as product order sheets, contract sheets, resumes, medical interview sheets, and various questionnaires, may be used as forms. By taking a product order sheet as an example of a form, the operation executed by the information processing apparatus 10 of this exemplary embodiment will be described below.

A form printed by the image forming apparatus 20 is distributed among intended users. Upon receiving the form, each user fills out the form by hand and returns it to a distributor of the form.

The image forming apparatus 20 optically reads the content of the form returned from each user and generates an image representing the content of the form (hereinafter simply called the image of the form).

The information processing apparatus 10 receives the image of the form from the image forming apparatus 20 via the communication network 2, for example. The information processing apparatus 10 then performs optical character recognition (OCR) processing on the image of each form so as to identify elements representing character strings described in the image of the form. The information processing apparatus 10 then recognizes these character strings and converts them into those represented by character code, and also records the positions of the character strings in the form in association with the character strings.

OCR processing can convert any image which is likely to include a character string into character code. Hence, not only handwritten characters input by a user, but also a character string printed on a form in accordance with form definition data is converted into character code. A character string is a set of one or more characters. Even one character is thus called a character string.

A character string also represents the content of an element in which a character string is input, and is thus also called the content.

Ideally, the content filled in a form is 100% correctly recognized by OCR processing. In actuality, however, the content filled in a form may be recognized wrongly due to faintly written characters, for example. Additionally, if a user writes a wrong character string in a form, logical inconsistencies may occur. For example, it is now assumed that a user has intended to input the number "1" in a form but has inadvertently written the number "2". In this case, even if the content in the form is recognized correctly by OCR processing, the content (that is, "2" in this case) may become logically inconsistent with the content in another element of the form.

A user in charge of checking a form (hereinafter simply called a form checker) checks the content of each form subjected to OCR processing performed by the information processing apparatus 10. If the checker finds the content which appears to have been recognized wrongly or any logically inconsistent content in the form, it corrects a corresponding error in the content. This can reproduce the correct content input by a user and consequently provide various services using forms as desired by a user.

The image forming apparatus 20 has an image forming function of forming an image on a recording medium. When the image forming apparatus 20 receives print data indicating a form, together with a print instruction, from the information processing apparatus 10 via the communication network 2, it prints the form on a recording medium in accordance with the received print data. Any printing method, such as the electrophotographic system or the inkjet method, may be used in the image forming apparatus 20.

The image forming apparatus 20 also optically reads the content filled in a form by using a scan function to generate an image of the form. The image forming apparatus 20 then sends the generated image of the form to the information processing apparatus 10 via the communication network 2.

In this exemplary embodiment, the image forming apparatus 20 has both the image forming function and the scan function. However, an image forming apparatus 20 having only one of the image forming function and the scan function and another image forming apparatus 20 having the other one of the functions may be used. In this case, these image forming apparatuses 20 are connected to the communication network 2. Alternatively, the information processing apparatus 10 may have the image forming function and the scan function. In this case, the image forming apparatus 20 is not necessary.

In the information processing system 1, the information processing apparatus 10 and the image forming apparatus 20 may not necessarily be connected to each other via the communication network 2. Print data indicating a form may be stored in a semiconductor memory, such as a universal serial bus (USB) memory or a memory card, and the semiconductor memory may be inserted into a memory slot of the image forming apparatus 20, thereby inputting the print data indicating the form into the image forming apparatus 20. Likewise, the image of the form generated in the image forming apparatus 20 may be sent to the information processing apparatus 10 by using a semiconductor memory.

The communication network 2 in the information processing system 1 may be a wired network, a wireless network, or a wired-and-wireless network. The communication network 2 may be a private network or may alternatively be a public network, such as the Internet, shared by many and unspecified devices.

Figure 2:
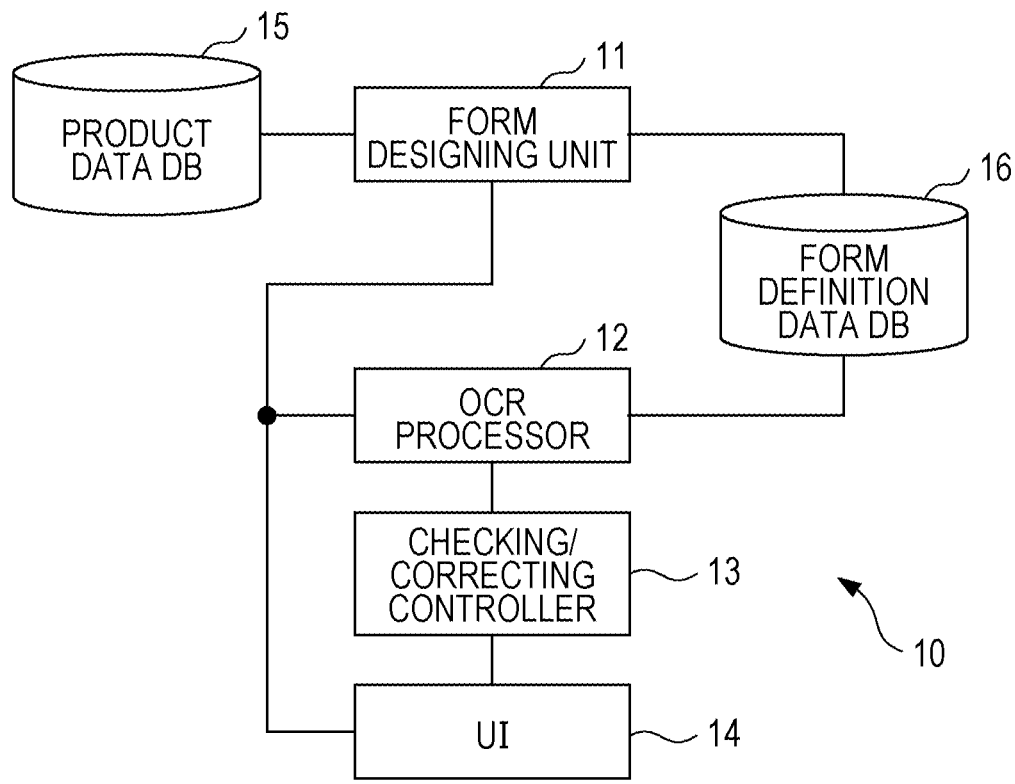
FIG. 2 is a block diagram illustrating an example of the functional configuration of an information processing apparatus.

FIG. 2 is a block diagram illustrating an example of the functional configuration of the information processing apparatus 10. As shown in FIG. 2, the information processing apparatus 10 includes, as functional modules, a form designing unit 11, an OCR processor 12, a checking/correcting controller 13, and a user interface (UI) 14, and also includes a product data database (DB) 15 and a form definition data DB 16.

In response to an instruction from a form designer, the form designing unit 11 generates form definition data concerning the format of a form to be distributed to users and attributes of each object to be disposed on the form in accordance with the format. The form designing unit 11 stores the generated form definition data in the form definition data DB 16. The form designing unit 11 also reads form definition data selected by a form designer from the form definition data DB 16, presents the read form definition data to the form designer, and receives updating of the form definition data.

An object in a form is a general term of a component forming the form. Examples of components forming a form are characters, lines, drawings, and elements in which a user fills the content.

In the case of a product order sheet designed as a form, products to be sold are already determined, and information concerning the products is managed in the product data DB 15.

Figure 3:
FIG. 3 illustrates an example of a product table.

FIG. 3 illustrates an example of a product table 4 managed in the product data DB 15. In the product table 4, fields such as the identification (ID), number, name, and unit price are registered in association with each product.

The ID is identification information uniquely assigned to a product to allow the product data DB 15 to identify the product. The ID is used as a primary key in the product data DB 15.

Unlike the ID, the number is identification information uniquely assigned to a product to allow a form designer to identify the product. When designing a form, a form designer selects a product number as information for identifying the product.

The name is the name of a product represented by the product number. The unit price is a price per product represented by the product number.

Upon receiving an instruction to design a form from a form designer, the form designing unit 11 obtains the product table 4 from the product data DB 15 and displays information concerning selected products in designated areas of the format of the form designed by the form designer.

FIG. 4 illustrates an example of a form designing screen 30 displayed on the display of the information processing apparatus 10 when a form designer is designing a form.

The form designing screen 30 is largely divided into a form region 31 and an attribute setting region 32. In the form region 31, the visual image of a form designed by a form designer is displayed. In the attribute setting region 32, attributes of each element of the form displayed in the form region 31 are set.

The attributes of each element of a form refers to features of a corresponding element of the form in which the content is filled. Attributes are set for each element.

In the product order sheet displayed in the form region 31, elements concerning each of the items such as the number, name, unit price, quantity, and sub-total are provided for each product.

In the attribute setting region 32 of the form designing screen 30 shown in FIG. 4, examples of the attributes of an element of the product number selected in the form region 31 (for example, the "A001" element) are displayed. Examples of the attributes set in the attribute setting region 32 are the name, format, machine learning module name, collation type, reference, column, value (primary key), load, calculation expression, coordinates, and size, which will be discussed below.

The name is an attribute which is set to identify a selected element of the form region 31. As the name, a character string representing the content described in the selected element is set. In the example in FIG. 4, the element indicating the product number is selected, and thus, "A001 number" using the product number in this element is set as the name.

The format is an attribute for setting the display mode of a character string in a selected element. The display mode of a character string represents visual characteristics of the character string, such as the number of lines containing the character string and the size, font, and thickness of characters of the character string. In the example in FIG. 4, "one-line character-string frame", which is a display mode for displaying the content of the selected element (more specifically, the product number) in one line, is set. If the size, font, and thickness of characters are not set as the format attribute, standard characters having a predetermined size, font, and thickness are used.

The machine learning module name is an attribute for setting a character-string recognition module used for OCR processing performed on the image of a form. In the example in FIG. 4, the product number is represented by alphanumeric characters, and to enhance the recognition rate of the character string in an element indicating the product number, an alphanumeric-character recognition module is set. This recognition module is a module having conducted artificial intelligence (AI) learning dedicated to alphanumeric character recognition.

The collation type is an attribute representing how to determine the content input in a selected element. In the example in FIG. 4, "option" is set as the collation type. "Option" refers to that a character string (the content) selected by a form designer from among registered plural character strings is set in a selected element.

The reason why "option" is set as the collation type is as follows. In an element of the form region 31 indicating the product number, one of the product numbers registered in the number field of the product table 4 is described. The collation type includes some other types apart from "option", and details of the other types will be discussed later.

The column is an attribute representing a location where reference is made to identify which product number in the product table 4 managed by the product data DB 15 corresponds to the product number indicated in the selected element. If the file name of the product table 4 is "PRODUCTS_TABLE", the product number is described in the number field of the product table 4. "[PRODUCTS_TABLE].[Number]", for example, is thus set as the column.

The value (primary key) is an attribute for specifying a product registered in the product table 4. In this example, a product is specified by using the product data DB 15, and thus, as the value (primary key), the ID used by the product data DB 15 to refer to the product table 4 is used instead of the product number. In the example in FIG. 4, "001" is set as the value (primary key). By combining this value (primary key) with the column attribute, "A001" can be obtained from the product table 4 as the product number.

The load is an attribute for determining whether to display information obtained from the product table 4 in a selected element as a character string. As the load attribute, "TRUE" OR "FALSE" is set. If "TRUE" is set, information obtained from the product table 4 is displayed in the selected element by using the attributes of the column and the value (primary key).

If "FALSE" is set, information obtained from the product table 4 is not displayed in the selected element. In this case, a form designer inputs a suitable character string into the selected element, instead of the product number registered in the product table 4.

The coordinates are an attribute representing the position of a selected element in a form. For example, the coordinates at the top left point of a frame which defines the selected element are set. The form designing unit 11 automatically sets the coordinates in accordance with the format of a designed form. A form designer however may be able to correct the coordinates set by the form designing unit 11.

The size is an attribute representing the range of a selected element. If the element is represented as a rectangle, the horizontal length and the vertical length of the element are set as the size. The form designing unit 11 automatically sets the size in accordance with the format of a designed form. A form designer however may be able to correct the size set by the form designing unit 11.

As a result of setting the coordinates and the size of a selected element, the range of an image of a form to be subjected to OCR processing by the OCR processor 12, which will be discussed later, is defined. A selected element and the content recognized by OCR processing can also be associated with each other.

FIG. 5 illustrates an example of the form designing screen 30 displayed on the display of the information processing apparatus 10 when a form designer has selected an element indicating the unit price of a product in the form region 31. In this case, attributes of the selected element (for example, the element indicating the unit price "1,480" of the product 001) are displayed in the attribute setting region 32.

In the example in FIG. 5, the element indicating the product unit price is selected, and the name "A001 unit price" using the product number related to this element is set as the name attribute.

Unlike the product number, the product unit price is represented only by numeric characters. A numeric-character recognition module is thus set as the machine learning module name, instead of an alphanumeric-character recognition module.

The product unit price is described in the unit price field of the product table 4. "[PRODUCTS_TABLE].[Unit price]", for example, is thus set as the column field.

As the collation type, "automatic" is set. If the collation type is "automatic", it means that, as a result of determining the content of an associated element having the collation type "option", a character string (the content) can automatically be determined from among registered plural character strings.

The reason why "automatic" is set for the element indicating the product unit price is as follows. If the product number is set, the unit price corresponding to this product number is automatically determined by referring to the product table 4. For example, the product table 4 shows that the unit price of the product represented by the number "A001" is 1480 yen. "1,480" is thus input into the element indicating the unit price of the product represented by the number "A001".

As the reference attribute for an element having the collation-type "automatic", the name of the element that can be referenced to determine the target content is set. In the example in FIG. 5, the product unit price can be determined in accordance with the product number, and "A001 number" is set as the reference attribute.

Among the attributes displayed in the attribute setting region 32 in FIG. 5, the attributes that have not been explained are the same as the counterparts shown in FIG. 4.

If the product number is set, the product name is also automatically determined by referring to the product table 4. "Automatic" is thus set as the collation type of an element indicating the product name.

If a form designer has selected an element indicating the product name, such as "product 001", "automatic" is set as the collation type in the attribute setting region 32, as shown in FIG. 5.

In this case, as the name attribute in the attribute setting region 32, "A001 name" using the product name in the selected element is set.

As the product name, Kanji (Chinese characters), Hiragana (Japanese phonetic syllabary), Katakana (Japanese phonetic syllabary), numeric characters, and alphanumeric characters may be used. As the machine learning module name, a recognition module (for example, "general_printing-characters") which recognizes all types of characters used for a form is set.

The product name is described in the name field of the product table 4. "[PRODUCTS_TABLE].[Name]", for example, is thus set as the column field.

Figure 6:
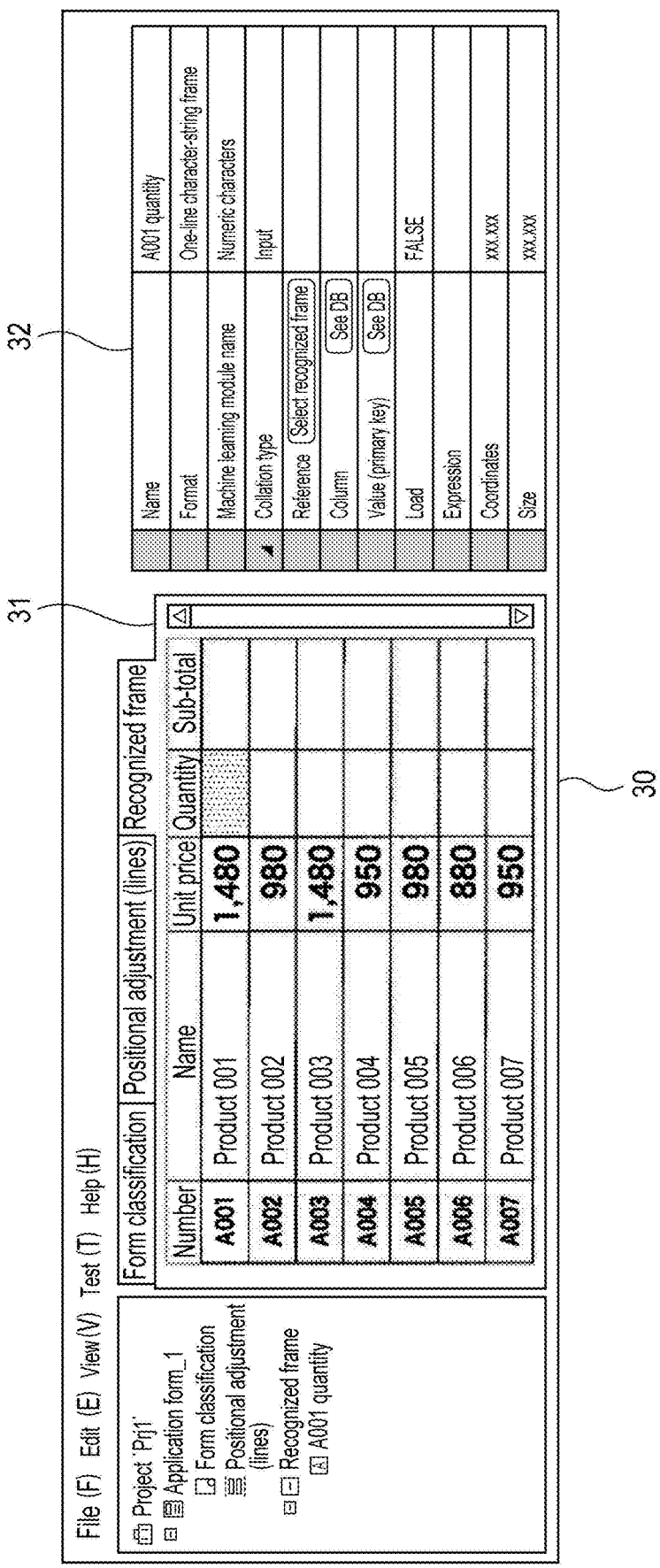
FIG. 6 illustrates an example of a form designing screen displayed when the product quantity is selected.

FIG. 6 illustrates an example of the form designing screen 30 displayed on the display of the information processing apparatus 10 when a form designer has selected an element of the form region 31 in which the product quantity will be input. In this case, attributes of the selected element (for example, the shaded element in FIG. 6 in which the quantity of the product 001 will be input) are displayed in the attribute setting region 32.

In the example in FIG. 6, the element in which the quantity of the product 001 will be input is selected, and the name "A001 quantity" using the product number related to this element is set as the name attribute.

Unlike the product number, the quantity of a product is represented only by numeric characters, and a numeric-character recognition module is set as the machine learning module name, instead of an alphanumeric-character recognition module.

The quantity of a product is not input by a form designer, but is manually input by a user placing an order. "Input" is thus set as the collation type. That is, if the collation type is "input", it means that the content of a selected element is not registered in the product table 4 and has not been determined when a form is designed. To leave an element having the collation type "input" blank, "FALSE" is set as the load attribute.

This means that no value is set in the column attribute or the value (primary key) attribute to refer to a location which can be checked for information in the product table 4. Unlike an element having the collation type "automatic", the content in the selected element is not automatically determined in accordance with the content of an associated element having the collation type "option". No value is set in the reference attribute, either.

The product quantity to be manually input by a user is an example of a first element in this exemplary embodiment.

Among the attributes displayed in the attribute setting region 32 in FIG. 6, the attributes that have not been explained are the same as the counterparts shown in FIG. 4.

Figure 7:
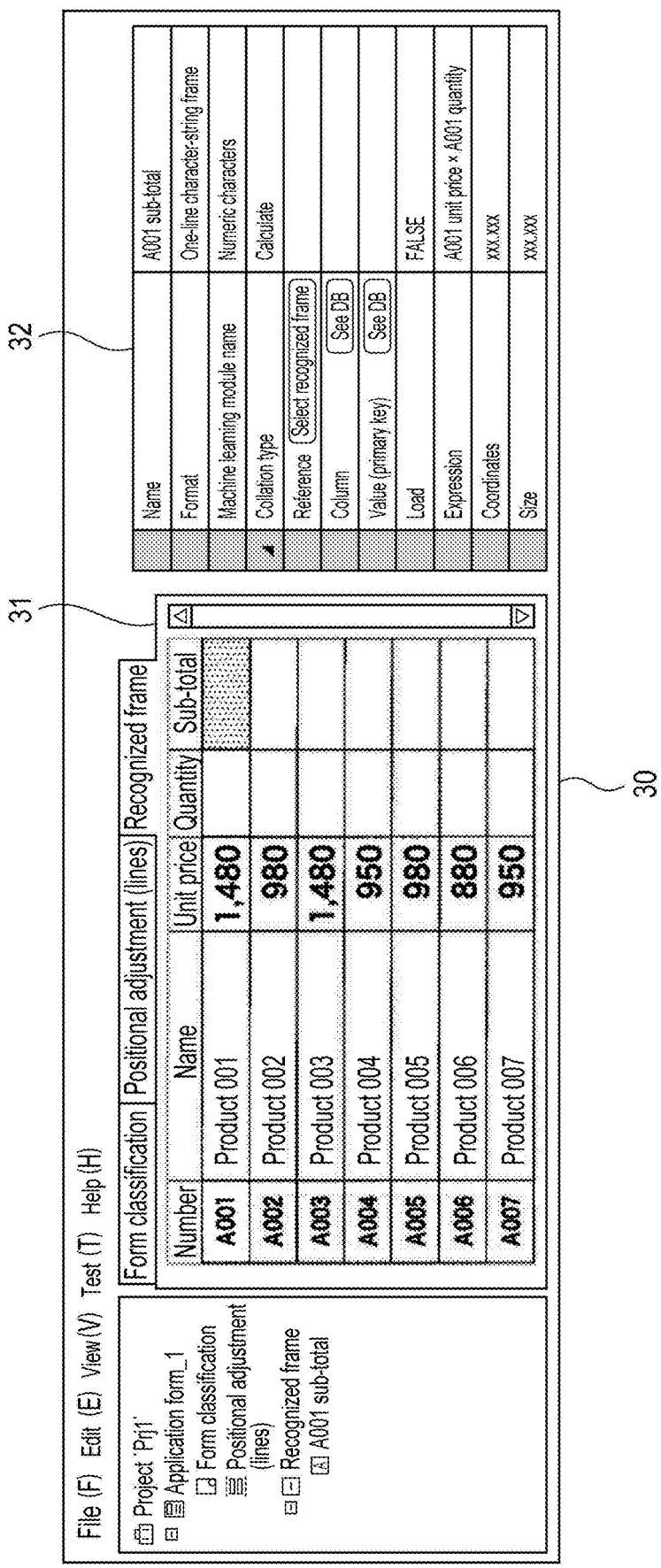
FIG. 7 illustrates an example of a form designing screen displayed when the product sub-total is selected.

FIG. 7 illustrates an example of the form designing screen 30 displayed on the display of the information processing apparatus 10 when a form designer has selected an element of the form region 31 in which the sub-total of a product ordered by a user will be input. In this case, attributes of the selected element (for example, the shaded element in FIG. 7 in which the sub-total of the product 001 will be input) are displayed in the attribute setting region 32. As in the quantity of a product, the sub-total of a product is manually input by a user placing an order in accordance with the quantity of the product.

In the example in FIG. 7, the element in which the sub-total of the product 001 will be input is selected. The name "A001 sub-total" using the product number related to this element is thus set as the name attribute.

Unlike the product number, the sub-total of a product, as well as the quantity of a product, is represented only by numeric characters, and a numeric-character recognition module is set as the machine learning module name, instead of an alphanumeric-character recognition module.

The sub-total of a product is not input by a form designer, but is manually input by a user placing an order. However, the content to be input as the sub-total is dependent on the content of another item, and "calculate" is thus set as the collation type.

If the collation type of a selected element is "calculate", it means that the content to be input can be estimated from the content of at least one of the elements having the collation type "input". That is, the selected element and at least one of the elements having the collation type "input" have a dependency relationship.

For example, the sub-total of a product is expressed by the mathematical product of the unit price and the quantity of the product. The sub-total of the product can thus be estimated based on the content of the element indicating the unit price of the product and that indicating the quantity of the product. Hence, "calculate" is set as the collation type. The element of the form region 31 having the collation type "calculate" is left blank and "FALSE" is set as the load attribute.

This means that no value is set in the column attribute or the value (primary key) attribute to refer to a location which can be checked for information in the product table 4. Unlike an element of the form region 31 having the collation type "automatic", the content in the selected element is not automatically determined merely from information registered in the product table 4. No value is set in the reference attribute, either.

The expression is an attribute which defines a calculation expression for calculating the content to be set in a selected element. In the expression attribute, the name of an element of the form region 31 used for calculation is included. For example, the sub-total of the product 001 is expressed by the mathematical product of the unit price of the product 001 and the ordered quantity of the product 001. Hence, "A001 unit price×A001 quantity" is set as the expression attribute for the element in which the sub-total of the product 001 will be input.

As the product quantity is included in a calculation expression for calculating the product sub-total, one element serves as a variable in a calculation expression which defines another element. Elements having such a relationship are an example of elements having a dependency relationship in this exemplary embodiment. The form designing unit 11 sets such a dependency relationship between selected elements. That is, the form designing unit 11 is an example of a setter in this exemplary embodiment.

The sub-total of a product that can be estimated from the quantity of the product is an example of a second element in this exemplary embodiment.

Among the attributes displayed in the attribute setting region 32 in FIG. 7, the attributes that have not been explained are the same as the counterparts shown in FIG. 4.

The form designing unit 11 generates form definition data which defines a form designed on the form designing screen 30. The generated form definition data is managed in the form definition data DB 16.

The attributes of elements displayed in the attribute setting region 32 shown in FIGS. 4 through 7 are only examples. Attributes of elements included in a form are not restricted to those shown in FIGS. 4 through 7.

FIGS. 8A and 8B illustrate an example of form definition data concerning a product order sheet designed with reference to the product table 4 shown in FIG. 3.

The form definition data is managed as two tables, for example, within the form definition data DB 16. One table is a form table 6 shown in FIG. 8A, and the other table is an attribute table 8 shown in FIG. 8B.

The form table 6 is a table representing a list of forms managed in the form definition data DB 16. The ID, number, and name, for example, are associated with each form.

The ID is identification information uniquely assigned to each form to allow the form definition data DB 16 to internally identify a corresponding form.

The number is identification information for relating the form table 6 to the attribute table 8. The value assigned to a form by a form designer, for example, is set as the number.

As the name in the form table 6, the name of a form assigned by a form designer is set.

The attribute table 8 is a table for managing attributes of each element of a form which are set on the form designing screen 30. As the attributes, the ID, number, form ID, name, format, collation type, expression, machine learning module name, load, value (primary key), column, coordinates, and size, for example, are associated with each element.

The ID is identification information uniquely assigned to each element of a form to allow the form definition data DB 16 to internally identify a corresponding element.

The number is set for an element of the form region 31 on the form designing screen 30 and is identification information for identifying this element on the form designing screen 30.

The form ID is identification information for relating the attribute table 8 to the form table 6, and the form ID is associated with the number in the form table 6. That is, the form ID makes it possible to identify the form of a corresponding element.

As the name, format, collation type, expression, machine learning module name, load, value (primary key), column, coordinates, and size, corresponding attributes set in the form designing screen 30 are used.

When a form designer has selected the number of a form in the form table 6, the form designing unit 11 extracts the form definition data concerning the selected form from the form definition data DB 16. This enables the form designer to make corrections in the provisionally designed form.

The OCR processor 12 in FIG. 2 performs OCR processing on the image of a form generated by the image forming apparatus 20, and supplies the OCR character recognition result (may also be called the OCR result of a form) to the checking/correcting controller 13.

The OCR result of a form indicates the recognition result of the content of the form by element. More specifically, the OCR processor 12 recognizes the name indicated in the form by performing OCR processing and refers to the form definition data corresponding to this name stored in the form definition data DB 16. The OCR processor 12 then associates the content of each element recognized by OCR processing with the attributes of a corresponding element. If the name is not indicated in the form, a form checker, for example, may input the name of the form into the OCR processor 12. A form designer and a form checker may be the same person or may be different persons.

The OCR processor 12 also sets the recognition accuracy degree of the recognition result by element in the form. The OCR processor 12 describes the association between the recognition accuracy degree and the corresponding element in the OCR result and supplies it to the checking/correcting controller 13.

The recognition accuracy degree is the level of the accuracy in recognizing a character string included in the image of a form, and more specifically, the degree representing how accurately a character string included in the image of the form is read as that described in the form. For example, if the recognition accuracy degree is 100%, a character string is read exactly as that described in the form. If the recognition accuracy degree is 50%, a character string is not read as that described in the form once in every two times.

Upon receiving the OCR result of the form from the OCR processor 12, the checking/correcting controller 13 displays the OCR result on a checking/correcting screen 33 (see FIG. 11, for example), which will be discussed later. On the checking/correcting screen 33, the content of each element is displayed in a predetermined display order in accordance with the collation type set for each element. In this case, regarding the element that may desirably be checked by a form checker, the probable reason why an error concerning a dependency relationship between this element with another element has occurred is displayed on the checking/correcting screen 33, based on the recognition accuracy degree and the attributes of this element.

If the form checker has provided an instruction to correct the content of this element after checking the checking/correcting screen 33, the checking/correcting controller 13 corrects the content of the element as instructed by the form checker.

As described above, the checking/correcting controller 13 displays the recognition result of an element having a dependency relationship with another element and displays a probable reason why an error concerning the dependency relationship has occurred. The checking/correcting controller 13 is thus an example of a first display controller and is also an example of a second display controller in this exemplary embodiment.

The UI 14 receives an instruction from a form designer and supplies this instruction to the form designing unit 11. The UI 14 also displays the form designing screen 30 on a display unit 49, which will be discussed later, in accordance with an instruction from the form designing unit 11. The UI 14 also receives an instruction concerning the execution of OCR processing and supplies this instruction to the OCR processor 12 and displays the OCR processing result on the display unit 49. The UI 14 also receives an instruction from a form checker and supplies this instruction to the checking/correcting controller 13 and displays the checking/correcting screen 33 on the display unit 49 in accordance with an instruction from the checking/correcting controller 13.

The UI 14, which receives a checking/correcting result of checking and correcting a recognition result displayed on the checking/correcting screen 33, is an example of a receiver in this exemplary embodiment.

Examples of the major components of the electrical system configuration of the information processing apparatus 10 will now be described below.

Figure 9:
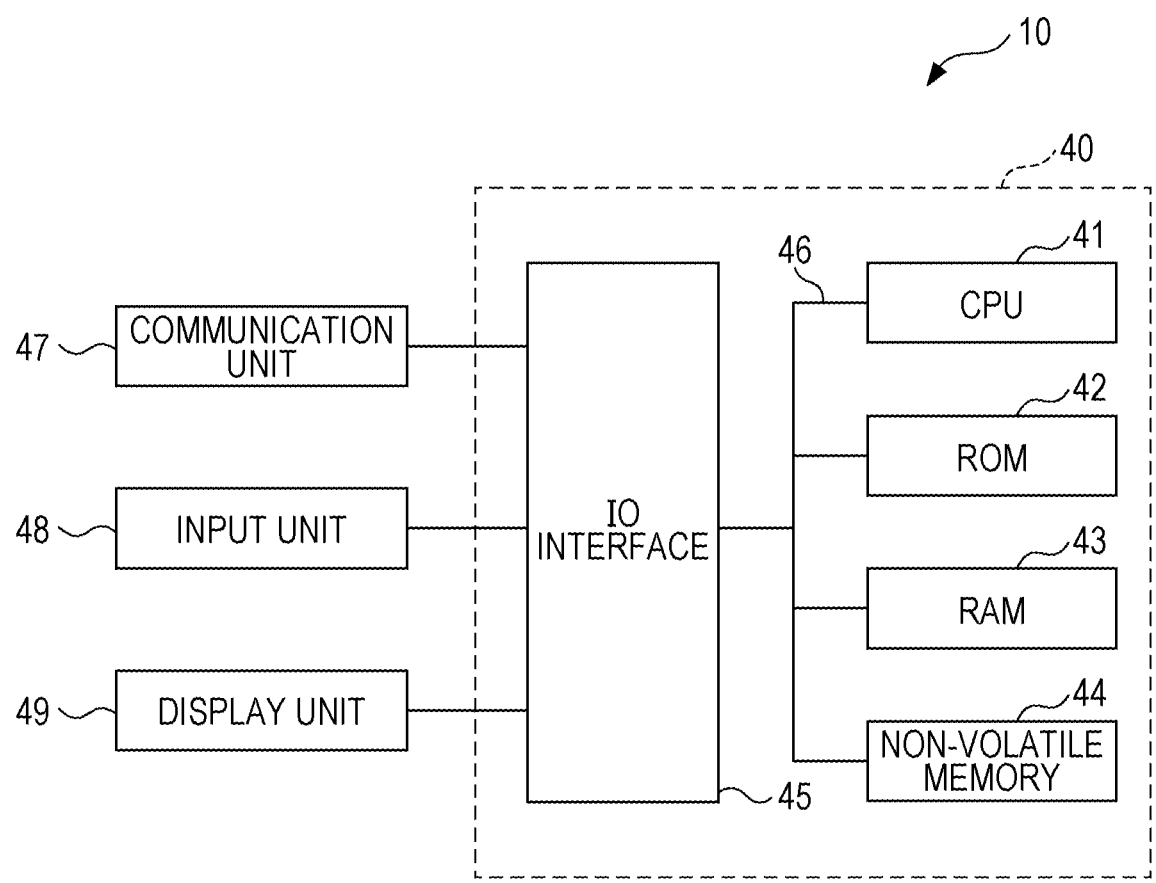
FIG. 9 illustrates examples of the major components of the electrical system configuration of the information processing apparatus.

FIG. 9 illustrates examples of the major components of the electrical system configuration of the information processing apparatus 10. The information processing apparatus 10 is constituted by a computer 40, for example.

The computer 40 includes a central processing unit (CPU) 41, a read only memory (ROM) 42, a random access memory (RAM) 43, a non-volatile memory 44, and an input/output (IO) interface 45. The CPU 41 implements the individual functions of the information processing apparatus 10. The ROM 42 stores an information processing program for causing the computer 40 to serve as the individual functions shown in FIG. 2. The RAM 43 is used as a temporary work area for the CPU 41. The CPU 41, the ROM 42, the RAM 43, the non-volatile memory 44, and the IO interface 45 are connected to one another via a bus 46.

The non-volatile memory 44 is an example of a storage device that can retrieve stored information even after power supplied to the non-volatile memory 44 is interrupted. As the non-volatile memory 44, a semiconductor memory, for example, is used, or a hard disk may alternatively be used. The non-volatile memory 44 may not necessarily be contained in the computer 40, and may be a portable storage device, such as a memory card, attachable to and detachable from the computer 40.

A communication unit 47, an input unit 48, and a display unit 49, for example, are connected to the IO interface 45.

The communication unit 47 is connected to the communication network 2 and has a communication protocol for performing data communication with devices connected to the network 2, such as the image forming apparatus 20.

The input unit 48 is a device that receives an instruction from a checker and supplies this instruction to the CPU 41. Examples of the input unit 48 are buttons, a touchscreen, and a keyboard and a mouse. If a checker instruction is given by sound, a microphone may be used as the input unit 48.

The display unit 49 is a device that displays information processed by the CPU 41. Examples of the display unit 49 are a liquid crystal display and an organic electroluminescence (EL) display.

The operation performed by the information processing apparatus 10 when a form checker checks and corrects the OCR result of a form returned from a user.

Figure 10:
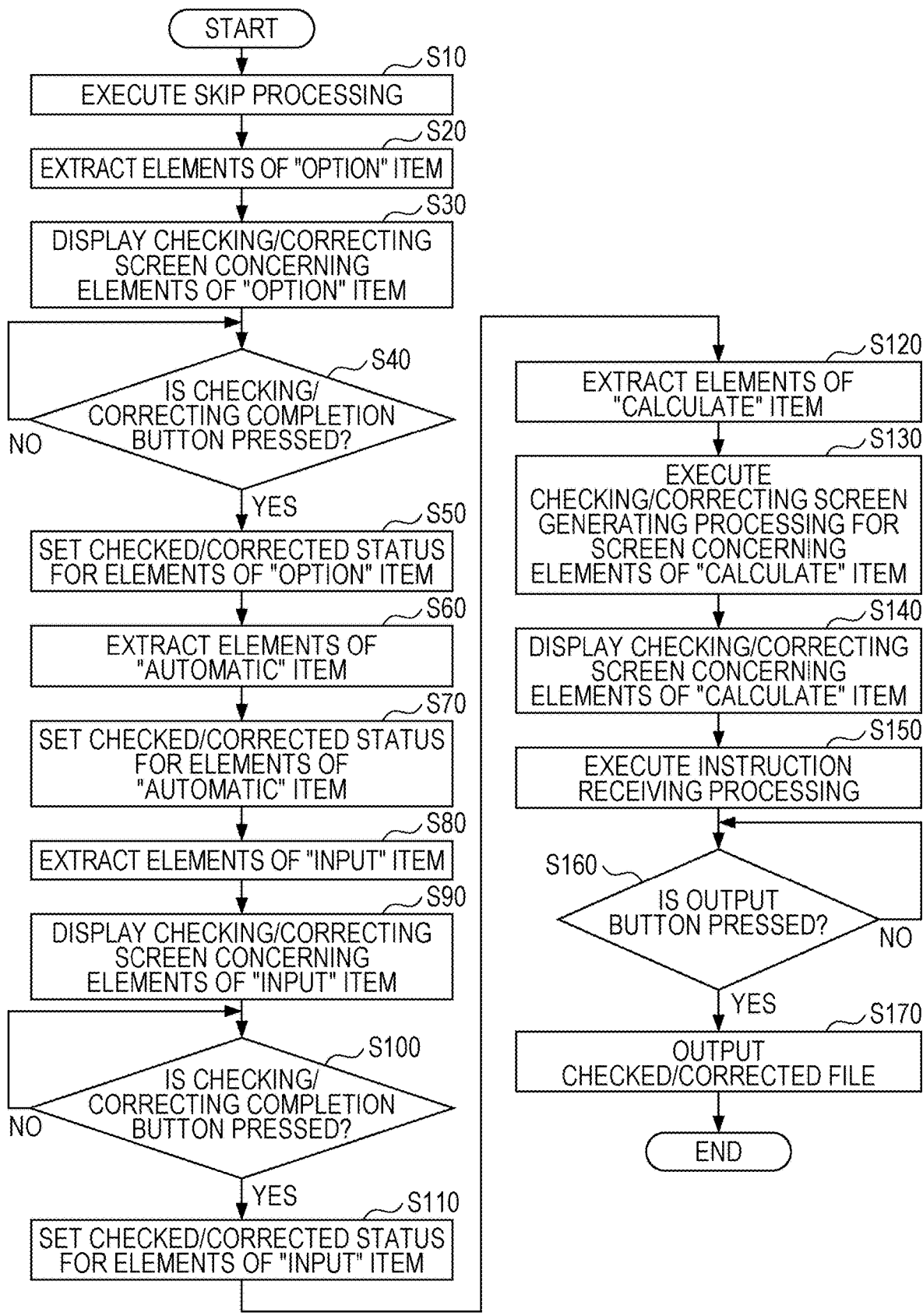
FIG. 10 is a flowchart illustrating an example of checking/correcting processing.

FIG. 10 is a flowchart illustrating an example of checking/correcting processing executed by the CPU 41 of the information processing apparatus 10 upon receiving the OCR result of the image of a form generated in the image forming apparatus 20. The information processing program which defines checking/correcting processing is stored in the ROM 42 of the information processing apparatus 10, for example.

The CPU 41 executes checking/correcting processing by reading the information processing program from the ROM 42.

A user places an order for only required products among products described in an order sheet. The quantity field and the sub-total field of products that are not ordered by a user are left blank. Among the products described in the order sheet, products for which the quantity field and the sub-total field are left blank can be assumed to be products that have not been ordered. It is thus desirable to exclude such products from a list of subjects to be checked by a form checker.

In step S10, by referring to the OCR result of the form and form definition data, the CPU 41 executes skip processing for skipping products for which the quantity field and the sub-total field in the order sheet are left blank. In other words, the CPU 41 extracts products described in the order sheet other than the skipped products. The extracted products will be called subject products.

In step S20, the CPU 41 extracts elements of the item for which the collation type is "option" (hereinafter simply called the "option" item) from among elements of the subject products extracted in step S10.

In step S30, the CPU 41 displays a checking/correcting screen 33 on the display unit 49. The checking/correcting screen 33 includes the recognition results of the elements of the "option" item extracted in step S20.

Figure 11:
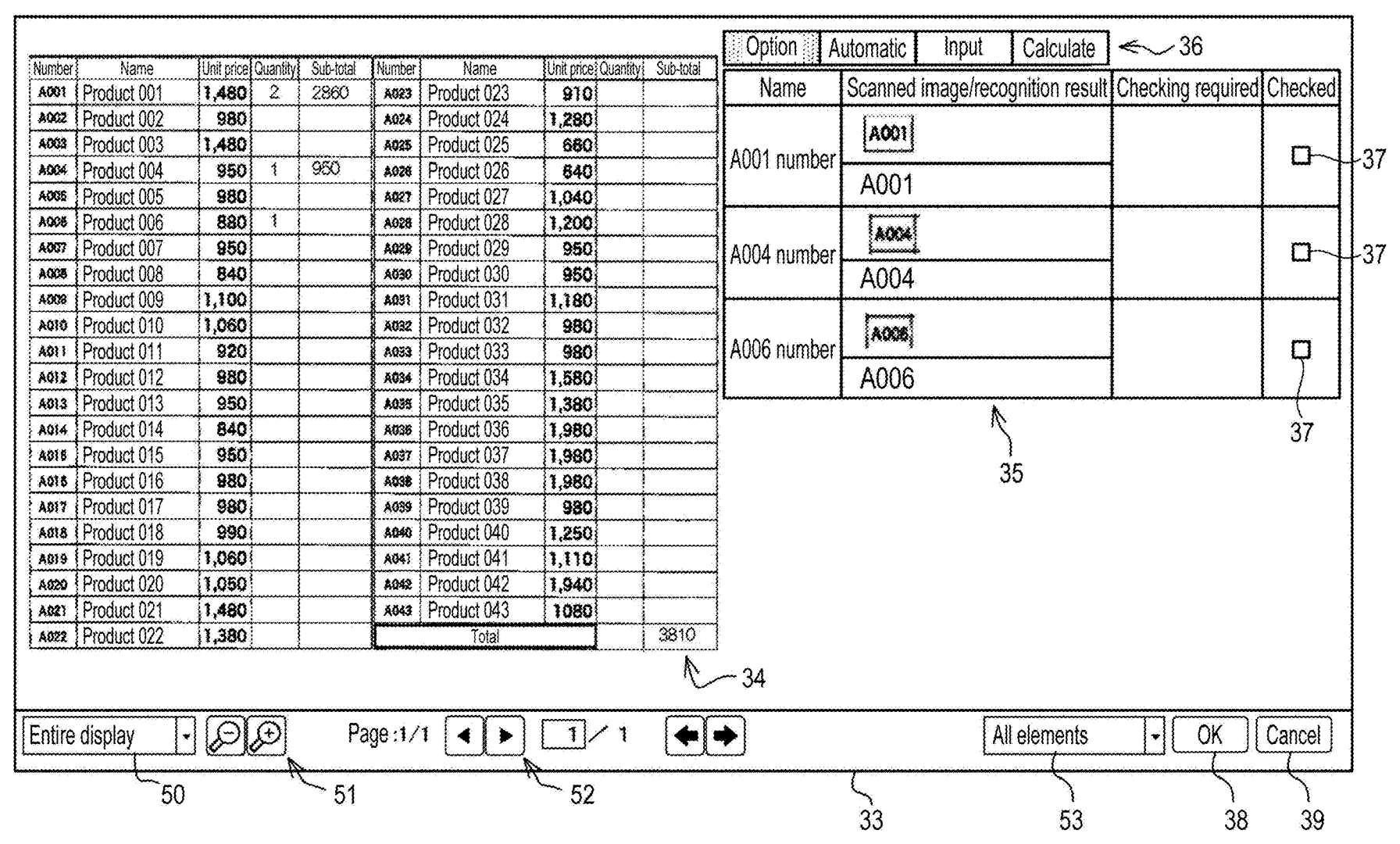

FIG. 11 illustrates an example of the checking/correcting screen 33 showing the elements of the "option" item.

The checking/correcting screen 33 includes a form image region 34 where the image of a form subjected to OCR processing is displayed, a checking/correcting region 35 where the OCR result of the form is checked and corrected, and a collation-type display region 36 where the collation type of elements displayed in the checking/correcting region 35 are displayed.

The checking/correcting screen 33 shown in FIG. 11 is a screen for displaying the elements of the "option" item. In the collation-type display region 36, "option" is thus selected.

In the checking/correcting region 35, a name field, a scanned-image/recognition-result field, a checking-required field, and a checking field are displayed for each element of a selected collation-type item.

In the name field, the name of an element displayed in the checking/correcting region 35 is displayed.

The scanned-image/recognition-result field has two sections. In the upper section, the scanned image of an element extracted from the image of the form and represented by the name field in the checking/correcting region 35 is displayed. In the lower section, the OCR recognition result of the image of the element in the upper section is displayed. The OCR recognition result is displayed in an edit box. This enables a form checker to correct the OCR recognition result if the OCR recognition result is different from the scanned image displayed in the scanned image section or if the content input by a user seems to have an error.

In the checking-required field, an icon is displayed to attract the form checker's attention and instruct it to check the content of an element represented by the name field.

In the checking field, a check box 37 is displayed for each element. The check box 37 is checked when the form checker has checked that the content of an element represented by the name field is correct or when the form checker has corrected the content of an element. When the check box 37 of an element is checked, information that the content of this element has been checked is supplied to the CPU 41.

As discussed above, in the checking/correcting region 35 of the checking/correcting screen 33 shown in FIG. 11, the recognition results of the elements only related to the subject products are displayed. Elements related to the products displayed in the form image region 34 for which the quantity and the sub-totals are blank are not displayed in the checking/correcting region 35.

FIG. 12 is a flowchart illustrating an example of display processing executed by the CPU 41 to display the checking/correcting screen 33 on the display unit 49 in step S30.

In step S200, the CPU 41 selects one of the elements of a certain collation-type item displayed on the checking/correcting screen 33. In the example in FIG. 11, the CPU 41 selects one of the elements of the "option" item.

In step S210, the CPU 41 obtains from the OCR result the recognition accuracy degree associated with the recognition result of the element selected in step S200. The CPU 41 then judges whether the recognition accuracy degree is lower than or equal to a reference value.

The reference value is a threshold used for judging whether the OCR recognition result represents the correct content of a subject element. If the recognition accuracy degree is lower than or equal to the reference value, it means that the OCR recognition result may not represent the correct content of the subject element. In this case, the CPU 41 proceeds to step S220.

In step S220, in the checking-required field of the element selected in step S200, the CPU 41 displays an icon for attracting the checker's attention to indicate that the recognition result of the selected element may not be correct. In this case, in addition to the icon, the CPU 41 may display a message suggesting that the recognition result may be wrong in the checking/correcting region 35 in association with the element selected in step S200. The CPU 41 then proceeds to step S230.

If the CPU 41 has judged in step S210 that the recognition accuracy degree exceeds the reference value, the OCR recognition result is likely to represent the correct content of the subject element. The CPU 41 thus proceeds to step S230 by skipping step S220.

In step S230, the CPU 41 judges whether all the elements of the certain collation-type item displayed on the checking/correcting screen 33 have been selected. If an element that has not been selected is left, the CPU 41 returns to step S200. Then, steps S200 through S230 are repeated until all the elements of the certain collation-type item have been selected. As a result of executing display processing in FIG. 12, a suggestion can be made for the recognition result of each element displayed in the checking/correcting region 35 in accordance with the recognition accuracy degree.

If it is found in step S230 that all the elements of the certain collation-type item have been selected, the CPU 41 completes display processing in FIG. 12.

Operation tools are disposed on the checking/correcting screen 33. These operation tools can be used by a checker to change the display mode of the image of a form in the form image region 34 and to check and correct elements in the checking/correcting region 35.

For example, a switching tool 50 in FIG. 11 is an operation tool for selecting the range of the image of a form displayed in the form image region 34. When "entire display" is selected, the CPU 41 adjusts the size of the image of the form to be displayed entirely in the form image region 34. The switching tool 50 has another option, such as "partial display" to display part of the image of the form.

An enlarge/reduce selection tool 51 is a tool for selecting the display scale of the image of the form displayed in the form image region 34.

A page switching tool 52 is a tool for switching the page when elements displayed in the checking/correcting region 35 are not containable within one page.

The form checker compares a scanned image and its recognition result of each element displayed in the checking/correcting region 35 and checks an icon in the checking-required field. If the form checker has found an error in the recognition result of an element in the recognition result section, it corrects this error and checks the check box 37 in the checking field. If the form checker has found that the recognition result of an element in the recognition result section is correct, it checks the check box 37 in the checking field. After checking each element displayed in the checking/correcting region 35, the form checker presses a checking/correcting completion button 38 to inform the CPU 41 that the elements displayed in the checking/correcting region 35 have been checked and corrected.

If the form checker finds it troublesome to check all the check boxes 37 in the checking field of elements in the checking/correcting region 35, it may select "all elements" in a check element selecting tool 53 and then press the checking/correcting completion button 38. In this case, the CPU 41 is informed that all the check boxes 37 in the checking field provided for all product numbers are checked. If the form checker wishes to individually check the check boxes 37 and then press the checking/correcting completion button 38, it selects "individual checking" in the check element selecting tool 53. In this case, the CPU 41 is informed that the elements only having check marks in the check boxes 37 have been checked and corrected.

When a cancel button 39 is pressed, a check box 37 with a check mark is unchecked.

In step S40 in FIG. 10, the CPU 41 judges whether the form checker has pressed the checking/correcting completion button 38. If it is found that the checking/correcting completion button 38 is not pressed, the CPU 41 repeatedly executes step S40 to monitor whether the checking/correcting completion button 38 is pressed. If the checking/correcting completion button 38 is found to be pressed, the CPU 41 proceeds to step S50.

In step S50, the CPU 41 sets a "checked/corrected" status for checked and corrected elements of the "option" item. In other words, the "checked/corrected" status is not set for elements which have not been checked or corrected. This makes it possible to clarify which elements have been checked and corrected and which elements have not been checked or corrected.

In step S60, the CPU 41 extracts elements of the item for which the collation type is "automatic" (hereinafter simply called the "automatic" item) from among elements of the subject products extracted in step S10. In the product order sheet displayed on the checking/correcting screen 33 in FIG. 11, elements of the item concerning the name and those of the item concerning the unit price of the subject products are obtained.

Concerning an element of the "automatic" item, if the associated element of the "option" item (in this exemplary embodiment, the product number), which is referenced to determine the content of the element of the "automatic" item, has been checked and corrected, the content of the element of the "automatic" item is correctly set. In step S70, the CPU 41 thus sets the "checked/corrected" status for the elements of the "automatic" item. In some cases, however, among the elements of the "option" item, there may be an element that the form checker may have forgotten to check and correct.

If the "checked/corrected" status is not set for an element which is set as the reference attribute of a target element, the CPU 41 may display on the checking/correcting screen 33 identification information for identifying the element set as the reference attribute (the name of the element, for example), together with a message that checking/correcting of this element has not been completed.

In this manner, the CPU 41 performs control not to let a checker check and correct an element that is influenced by the content of another element until this element has been checked and corrected.

In step S80, the CPU 41 extracts elements of the item for which the collation type is "input" (hereinafter simply called the "input" item) from among elements of the subject products extracted in step S10.

In step S90, the CPU 41 displays on the display unit 49 a checking/correcting screen 33 including the recognition results of the elements of the "input" item extracted in step S80. As in step S30, the CPU 41 executes display processing shown in FIG. 12 to make various suggestions in the checking-required field based on the recognition accuracy degree of the recognition result of each element displayed in the checking/correcting region 35.

FIG. 13 illustrates an example of the checking/correcting screen 33 concerning the "input" item. In the product order sheet displayed on the checking/correcting screen 33 in FIG. 13, elements of the item concerning the product quantity are displayed in the checking/correcting region 35.

In the checking/correcting region 35 in FIG. 13, an icon is displayed in the checking-required field to attract the checker's attention and instruct it to check the content of the "A004 quantity" element. While the scanned image of the "A004 quantity" element shows "1", the recognition result indicates "7". The form checker thus changes the recognition result to "1".

As in the elements of the "option" item, the form checker checks each element of the "input" item and presses the checking/correcting completion button 38 when it has finished checking and correcting.

In step S100 in FIG. 10, the CPU 41 judges whether the form checker has pressed the checking/correcting completion button 38. If the checking/correcting completion button 38 is not pressed, the CPU 41 repeatedly executes step S100 to monitor whether the checking/correcting completion button 38 is pressed. If the checking/correcting completion button 38 is found to be pressed, the CPU 41 proceeds to step S110.

In step S110, the CPU 41 sets a "checked/corrected" status for checked and corrected elements of the "input" item.

In step S120, the CPU 41 extracts elements of the item for which the collation type is "calculate" (hereinafter simply called the "calculate" item) from among elements of the subject products extracted in step S10.

In step S130, the CPU 41 executes checking/correcting screen generating processing for generating a checking/correcting screen 33 including the recognition results of elements of the "calculate" item extracted in step S120.

Figure 14:
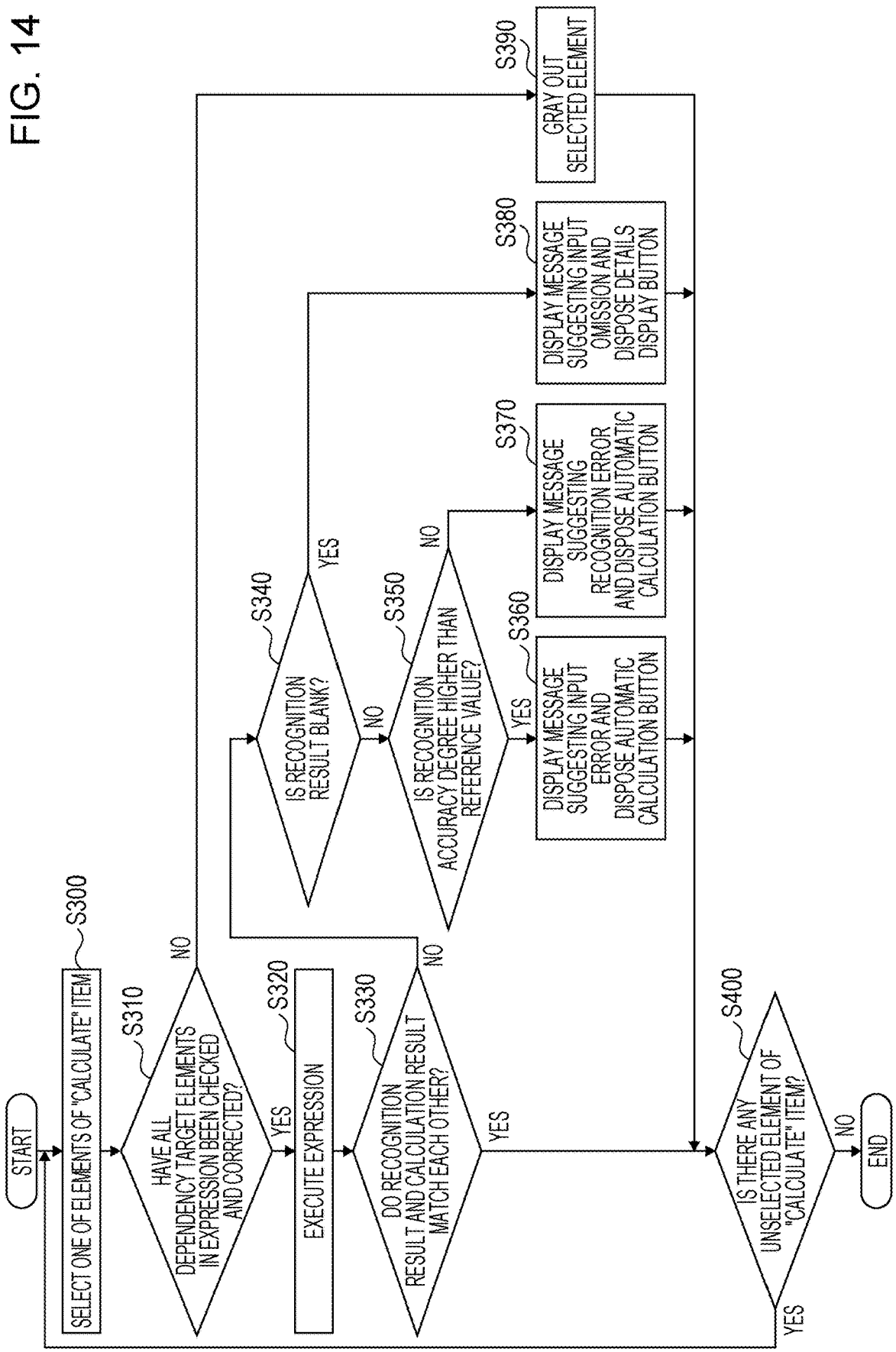
FIG. 14 is a flowchart illustrating an example of checking/correcting screen generating processing.

FIG. 14 is a flowchart illustrating an example of checking/correcting screen generating processing executed in step S130.

In step S300, the CPU 41 selects one of the unselected elements of the "calculate" item extracted in step S120.

In step S310, the CPU 14 obtains the calculation expression set for the element selected in step S300 (hereinafter simply called the selected element). The CPU 14 then refers to the status of each element included in the calculation expression (such an element will be called a dependency target element) and judges whether all the dependency target elements have been checked and corrected. The dependency target element included in the calculation expression is an example of the first element in this exemplary embodiment, and an element of the "calculate" item is an example of the second element in this exemplary embodiment.

If not all the dependency target elements included in the calculation expression are set to be the "checked/corrected" status, the CPU 41 proceeds to step S390.

In this case, at least one dependency target element has not yet been checked or corrected, and if the content of this dependency target element is changed later, the content of the selected element will accordingly be changed. Even if the form checker checks the content of the selected element, it may be required to check it again if the content of the dependency target element is changed.

In step S390, the selected element is grayed out to prevent the form checker from checking and correcting the recognition result of the selected element displayed in the checking/correcting region 35. The CPU 41 then proceeds to step S400. The form checker is thus unable to check and correct the correction result of the selected element until all the dependency target elements included in the calculation expression are set to be the "checked/corrected" status. Among the functional modules shown in FIG. 2, the checking/correcting controller 13 performs control so that checking or correcting of the recognition result of a selected element is not received until all dependency target elements have been checked and corrected. The checking/correcting controller 13 is thus an example of a receiving controller in this exemplary embodiment.

The recognition result of a dependency target element that has not been checked or corrected by a form checker is an example of a first character recognition result in this exemplary embodiment. The recognition result of a selected element, that is, the recognition result of an element of the "calculate" item, is an example of a second character recognition result in this exemplary embodiment.

If it is found in step S310 that all the dependency target elements included in the calculation expression are set to be the "checked/corrected" status, the CPU 41 proceeds to step S320. A dependency target element that has been checked and/or corrected is an example of a checking/correcting result in this exemplary embodiment.

In step S320, the CPU 41 executes the calculation expression by referring to the value of each dependency target element included in the expression and obtains the calculation result.

In step S330, the CPU 41 judges whether the recognition result of the selected element matches the calculation result obtained in step S320.

If the recognition result of the selected element is different from the calculation result, it means that the content of the dependency target elements and the recognition result of the selected element do not satisfy the corresponding dependency relationship. The CPU 41 then estimates the reason why the dependency relationship is not satisfied, and generates a checking/correcting screen 33 showing the estimated reason for the selected element that is not yet checked or corrected.

If the recognition result of the selected element is different from the calculation result, the CPU 41 proceeds to step S340. In step S340, the CPU 41 first judges whether the recognition result of the selected element is blank without any character string therein. If the recognition result is blank, the CPU 41 proceeds to step S380.

The dependency relationship is not satisfied unless the content is input into the selected element. In step S380, the CPU 41 generates a checking/correcting screen 33 including a message suggesting that a user may have forgotten to input the content into the selected element and proceeds to step S400. In this case, the CPU 41 disposes an icon in the checking-required field to attract the checker's attention and instruct it to check the content of the selected element.

The CPU 41 may generate a checking/correcting screen 33 also including a details display button 55, which will be discussed later, together with a message suggesting the input omission.

If it is found in step S340 that the recognition result is not blank, the CPU 41 proceeds to step S350.

In this case, the CPU 41 estimates the reason why the dependency relationship is not satisfied, based on the recognition accuracy degree of the recognition result of the selected element.

In step S350, the CPU 41 obtains the recognition accuracy degree associated with the recognition result of the selected element from the OCR result, and judges whether the recognition accuracy degree is higher than a reference value. This reference value may be the same value as that used in step S210 in FIG. 12 or may be different.

If the recognition accuracy degree is found to be higher than the reference value, the CPU 41 proceeds to step S360. In this case, it is more reasonable to assume that the user has input the wrong content in the selected element by mistake rather than that the content of the selected element in the form has been wrongly recognized by OCR processing. In step S360, the CPU 41 thus generates a checking/correcting screen 33 including a message suggesting that the content input in the selected element may be wrong, and proceeds to step S400. In this case, the CPU 41 disposes an icon in the checking-required field to attract the checker's attention and instruct it to check the content of the selected element.

The CPU 41 may generate a checking/correcting screen 33 also including an automatic calculation button 54, which will be discussed later, together with a message suggesting the input error.

If it is found in step S350 that the recognition accuracy degree is not higher than the reference value, the CPU 41 proceeds to step S370. In this case, it is more reasonable to assume that the content of the selected element in the form has been wrongly recognized by OCR processing rather than that the user has input the wrong content in the selected element by mistake. In step S370, the CPU 41 thus generates a checking/correcting screen 33 including a message suggesting that the recognition result of the selected element may be wrong, and proceeds to step S400. In this case, the CPU 41 disposes an icon in the checking-required field to attract the checker's attention and instruct it to check the content of the selected element.

The CPU 41 may generate a checking/correcting screen 33 also including the automatic calculation button 54, which will be discussed later, together with a message suggesting the recognition error. The CPU 41 may also display the recognition accuracy degree. Displaying the recognition accuracy degree allows the form checker to identify the degree of error in the recognition result. This may lead to the enhancement of the correction precision.

If it is found in step S330 that the recognition result of the selected element matches the calculation result, it can be assumed that the recognition result represents the correct content of the selected element without any logical inconsistencies. The CPU 41 thus proceeds to step S400 without displaying a message for instructing the form checker to correct the recognition result of the selected element on the checking/correcting screen 33.

In step S400, the CPU 41 judges whether any unselected element is left among the elements of the "calculate" item extracted in step S120. If such an element is left, the CPU 41 returns to step S300 and selects such an element. As a result of repeating steps S300 through S400 until all the elements of the "calculate" item obtained in step S120 have been selected, a determination has been made based on the dependency relationship whether the content input in each element of the "calculate" item is required to be corrected. Concerning an element to be corrected, a checking point is suggested.

If it is judged in step S400 that all the elements of the "calculate" item obtained in step S120 have been selected, the CPU 41 completes checking/correcting screen generating processing shown in FIG. 14.

After checking/correcting screen generating processing in step S130 in FIG. 10, the CPU 41 executes step S140.

In step S140, the CPU 41 displays the checking/correcting screen 33 generated in step S130 on the display unit 49. The checking/correcting screen 33 includes the recognition results of the elements of the "calculate" item.

FIG. 15 illustrates an example of the checking/correcting screen 33 displayed on the display unit 49 in step S140.

In the checking/correcting region 35 of the checking/correcting screen 33 in FIG. 15, elements of two "calculate" items concerning the ordered products among the products in the form image region 34 are displayed. More specifically, in this exemplary embodiment, the elements of the item concerning the sub-total of each of the ordered products and the element of the item concerning the total of the added sub-totals of the products are displayed.

As has been explained for the settings of the attributes concerning the sub-total of a product with reference to FIG. 7, the calculation expression for the sub-total of each product is expressed by "product unit price×product quantity". In this case, as indicated in the order sheet, the unit price of the product 001 represented by the number "A001" is 1480 yen and the quantity of the product 001 is "2", and the sub-total of the product 001 is 2960 yen. However, the recognition result of the element represented by the name "A001 sub-total" is "2860". Additionally, the recognition accuracy degree of the recognition result of the element "A001 sub-total" is found to be higher than the reference value, and step S360 in FIG. 14 is executed. As a result, the reason why an error concerning the dependency relationship has occurred is suggested on the checking/correcting screen 33, as in a message "User may have input a wrong value", and the automatic calculation button 54 is also displayed.

Based on the above-described suggestion displayed on the checking/correcting screen 33, the form checker recalculates the sub-total of the product and finds that the correct value of "A001 sub-total" is 2960 yen. The form checker accordingly corrects the sub-total of the product. The suggestion displayed on the checking/correcting screen 33 enables the form checker to recognize what to do first. This can save the checker comparing the image of an element in the scanned image section and the recognition result to check for an error in the OCR recognition result of the scanned image or the product price or quantity or to consider the possibility of the input error.

As indicated in the order sheet, the unit price of the product 004 represented by the number "A004" is 950 yen and the quantity is "1", and the sub-total of the product 004 is 950 yen. The scanned image section also indicates a character string "950". The recognition accuracy degree of the recognition result of the element "A004 sub-total" is lower than or equal to the reference value, and step S370 in FIG. 14 is executed. As a result, for the "A004 sub-total" element, the probable cause of an error concerning the dependency relationship is suggested on the checking/correcting screen 33, as in a message "Recognition result may be wrong", and the automatic calculation button 54 is also displayed.

In this case, the form checker first compares the image of the element in the scanned image section and the recognition result. The form checker then corrects "750" in the recognition result section to "950".

The recognition result section for the "A006 sub-total" element is blank. Step S380 in FIG. 14 is thus executed. As a result, for the "A006 sub-total" element, the probable cause of an error concerning the dependency relationship is suggested on the checking/correcting screen 33, as in a message "User may have forgotten to input a value", and the details display button 55 is also displayed.

In this case, the form checker recognizes that it is quicker to calculate the sub-total of the product and to input the calculated value in the recognition result section than checking for an error in the OCR recognition result or considering the possibility of the input error.

If the expression for calculating the total of the sub-totals of the products is associated with the "total" element, step S390 in FIG. 14 is executed. In this case, step S390 is continuously executed until the sub-total of each product displayed in the checking/correcting region 35 is checked and corrected and the check boxes 37 in the checking fields are all checked. During the execution of step S390, the "total" element is grayed out.

Concerning products for which the quantity and the sub-total in the form image region 34 are both blank, the sub-total of the products are internally set to be 0 yen, and the elements of such products are set to be the "checked/corrected" status.

On the checking/correcting screen 33 for the elements of the "calculate" item shown in FIG. 15, the automatic calculation button 54 and the details display button 55, which are not displayed in the checking/correcting region 35 for the elements of the "option", "automatic", and "input" items, are displayed.

In step S150 in FIG. 10, the CPU 41 executes instruction receiving processing for processing an instruction received from a checker provided on the checking/correcting screen 33 for an element of the "calculate" item.

Figure 16:
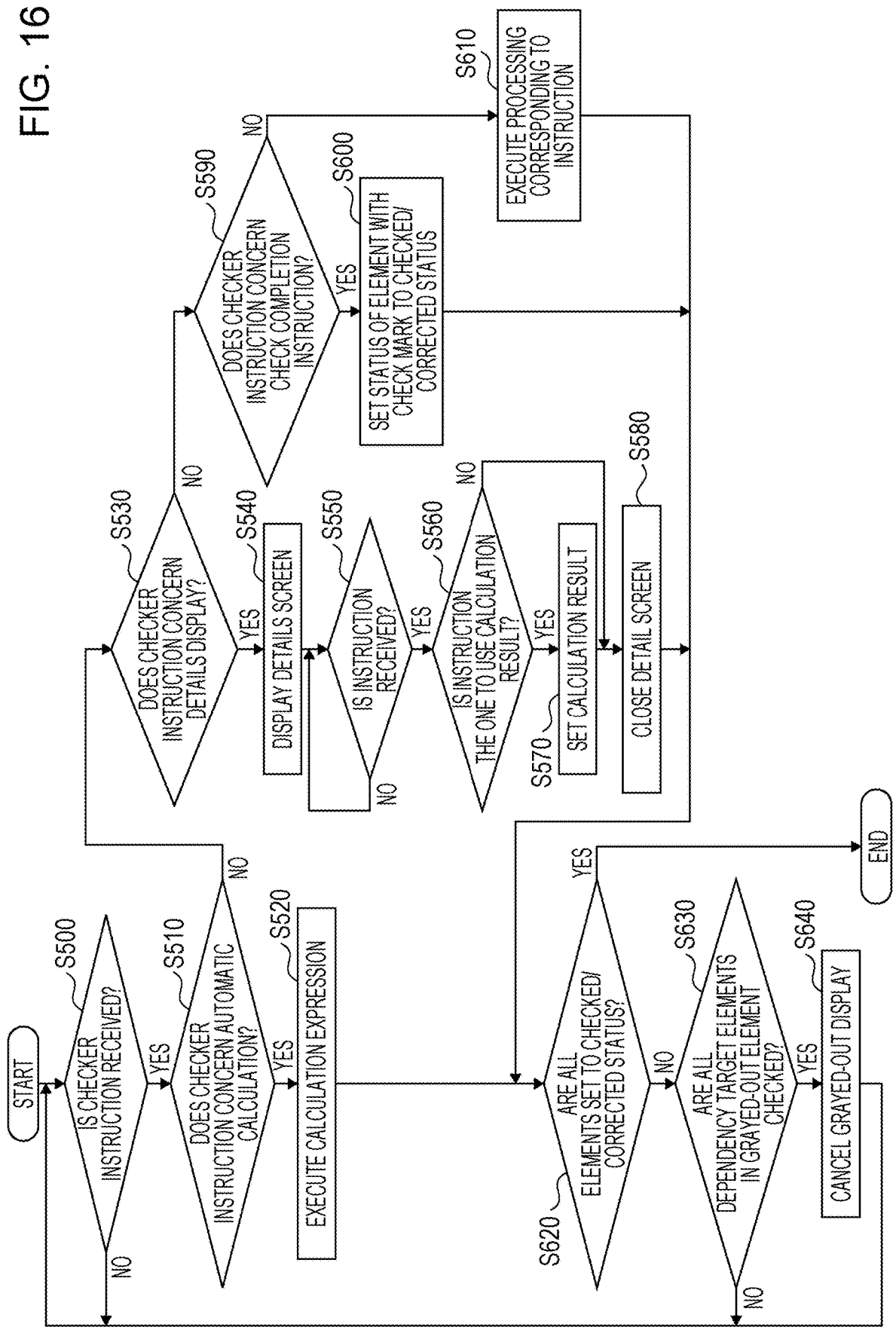
FIG. 16 is a flowchart illustrating an example of instruction receiving processing.

FIG. 16 is a flowchart illustrating an example of instruction receiving processing executed by the CPU 41 upon receiving an instruction from a checker provided on the checking/correcting screen 33 shown in FIG. 15.

In step S500, the CPU 41 judges whether an instruction is received from a checker. If no instruction is received, the CPU 41 repeats step S500 to monitor the reception of an instruction. If an instruction is received from a checker, the CPU 41 proceeds to step S510.

In step S510, the CPU 41 judges whether the received instruction is an automatic calculation instruction provided when a checker has pressed the automatic calculation button 54. If the received instruction is an automatic calculation instruction, the CPU 41 proceeds to step S520.

In step S520, the CPU 41 performs calculation to determine the content of the element associated with the pressed automatic calculation button 54 according to the expression indicated in this element. The CPU 41 then displays the calculation result on the checking/correcting screen 33 and proceeds to step S620. That is, if a form checker presses the automatic calculation button 54, the correct sub-total is automatically calculated without the form checker having to calculate the sub-total of a product according to the expression.

Even when the form checker has not pressed the automatic calculation button 54, if the dependency relationship between a selected element and a dependency target element is not satisfied, the CPU 41 may autonomously make calculation for this element and display the calculation result on the checking/correcting screen 33. In this case, the automatic calculation button 54 may not necessarily be displayed on the checking/correcting screen 33.

If it is found in step S510 that the received instruction is not an automatic calculation instruction, the CPU 41 proceeds to step S530.

In step S530, the CPU 41 judges whether the received instruction is a details display instruction provided when the checker has pressed the details display button 55. If the received instruction is a details display instruction, the CPU 41 proceeds to step S540.

In step S540, the CPU 41 displays a details screen 56 on the display unit 49.

FIG. 17 illustrates an example of the details screen 56. The details screen 56 is a popup screen, for example, displayed on top of the checking/correcting screen 33. The details screen 56 in FIG. 17 is a screen displayed when the details display button 55 associated with the "A006 sub-total" element in FIG. 15 is pressed on the checking/correcting screen 33.

The details screen 56 includes a first calculation region 57 and a second calculation region 58. The first calculation region 57 represents an image of a calculation expression and its calculation result using the scanned images of dependency target elements read from a form. The second calculation region 58 represents a calculation expression using the checking/correcting results of the dependency target elements. The sub-total of the product 006 is expressed by the unit price and the quantity of the product 006. In the first calculation region 57, the calculation expression and its calculation result using the scanned images of the "A006 unit price" element, the "A006 quantity" element, and the "A006 sub-total" element are displayed. In the example in FIG. 15, the scanned image of the "A006 sub-total" element is blank, and the calculation result in the first calculation region 57 is also blank.

In the second calculation region 58, the calculation expression using the checking/correcting result of the "A006 unit price" element and that of the "A006 quantity" element is displayed. In a calculation result display region 59, the calculation result obtained by calculating the expression indicated in the second calculation region 58 is displayed. If the form checker determines based on the display content in the first and second calculation regions 57 and 58 that the calculation result displayed in the calculation result display region 59 is correct as the content of the "A006 sub-total" element, it presses an "OK" button to inform the CPU 41 that it agrees to use the calculation result in the calculation result display region 59.

If the form checker determines that the calculation result displayed in the calculation result display region 59 is not correct, it presses a "cancel" button to inform the CPU 41 that it does not agree to use the calculation result in the calculation result display region 59.

In step S550 in FIG. 16, the CPU 41 judges whether an instruction to use the calculation result or an instruction not to use the calculation result is received. If neither of the instructions is received, the CPU 41 repeatedly executes step S550 to wait for an instruction from the form checker. If an instruction is received, the CPU 41 proceeds to step S560.

Even when the checker has not pressed the details display button 55, the CPU 41 may autonomously calculate the expression associated with a blank element and display the calculation result in the recognition result section of the element.

In step S560, the CPU 41 judges whether the instruction received in step S550 is an instruction to use the calculation result.

If the instruction is an instruction to use the calculation result, the CPU 41 proceeds to step S570. In step S570, the CPU 41 sets the value of the calculation result displayed in the calculation result display region 59 in the blank element, that is, in the content of the "A006 sub-total" element. The CPU 41 then proceeds to step S580.

If it is found in step S560 that the instruction is not an instruction to use the calculation result, the CPU 41 proceeds to step S580 by skipping step S570. That is, the value of the calculation result displayed in the calculation result display region 59 is not set as the content of the "A006 sub-total" element, which thus remains blank.

In step S580, the CPU 41 closes the details screen 56 and proceeds to step S620.

If the form checker presses the "cancel" button on the details screen 56 and does not use a value automatically calculated by the CPU 41 as the content of a blank element or an element to be corrected on the checking/correcting screen 33, it calculates the value by itself and sets the calculated value as the content of this element.

If it is found in step S530 that the received instruction is not a details display instruction, the CPU 41 proceeds to step S590.

In step S590, the CPU 41 judges whether the received instruction is a check completion instruction provided when a checker has checked a check box 37 in the checking field. If the instruction is a check completion instruction, the CPU 41 proceeds to step S600.

In step S600, the CPU 41 changes the status of the element with a check mark in the check box 37 to "checked/corrected", and proceeds to step S620.

If it is found in step S590 that the received instruction is not a check completion instruction, the CPU 41 proceeds to step S610. More specifically, if an operation tool, such as the page switching tool 52, other than the automatic calculation button 54, the details display button 55, and the check box 37 is operated, the CPU 41 proceeds to step S610.

In step S610, the CPU 41 executes processing corresponding to the received instruction and proceeds to step S620. If the page switching tool 52, for example, is operated, the CPU 41 switches the page in the checking/correcting region 35 on the checking/correcting screen 33.

In step S620, the CPU 41 judges whether the statuses of all the elements displayed in the checking/correcting region 35 have been changed to "checked/corrected". If not all the elements are changed to the "checked/corrected" status, the CPU 41 proceeds to step S630. That is, the CPU 41 proceeds to step S630 unless all the elements displayed in the checking/correcting region 35 have been checked and corrected.

In step S630, the CPU 41 refers to the calculation expression of an element which is grayed out in the checking/ correcting region 35, and judges whether the statuses of all the dependency target elements contained in the expression are changed to "checked/corrected".

If the CPU 41 has found that all the dependency target elements contained in the expression of the grayed-out element are changed to the "checked/corrected" status, it proceeds to step S640. In step S640, the CPU 41 cancels the grayed-out display of this element and lets the form checker check and correct this element.

In the "total" element on the checking/correcting screen 33 in FIG. 15, the expression for calculating the total of the products (added sub-totals of the products) is set, as discussed above. The "total" element is grayed out until the "A001 sub-total" element, "A004 sub-total" element, and "A006 sub-total" element are all checked and corrected. When these elements have been checked and corrected, the grayed-out display of the "total" element is canceled.

If it is found in step S630 that not all the dependency target elements contained in the expression set for a grayed-out element in the checking/correcting region 35 are changed to the "checked/corrected" status, or after step S640, the CPU 41 proceeds to step S500 and waits for an instruction from the form checker.

After repeating the above-described steps, if it is found in step S620 that the statuses of all the elements displayed in the checking/correcting region 35 have been changed to "checked/corrected", the CPU 41 completes instruction receiving processing in FIG. 16.

After executing instruction receiving processing in FIG. 16, all elements of all collation types of items of the subject products have been checked and corrected. Then, the form checker presses an output button, which is not shown, on the checking/correcting screen 33 to output the content filled in the product order sheet to a file.

In step S160 in FIG. 10, the CPU 41 judges whether the output button is pressed. If the output button is not pressed, the CPU 41 repeatedly executes step S160 to monitor whether the output button is pressed. If the output button is pressed, the CPU 41 proceeds to step S170.

In step S170, the CPU 41 outputs the content of the checked and corrected elements included in the product order sheet to a file. The file is not restricted to a particular format. The format which matches the format to be used in postprocessing, such as product shipping processing, is used.

For example, a comma-separated values (CSV) file or an extensible markup language (XML) file is used. Forming the product order sheet including the handwritten content into a file allows an operator to use the data of this order sheet by using a computer when performing postprocessing, thereby enhancing the work efficiency compared with when a paper order sheet is used.

Checking/correcting processing shown in FIG. 10 is then completed.

As described above, when a form checker checks the content of a form, the information processing apparatus 10 of this exemplary embodiment performs control to determine the display order of elements based on the dependency relationship between elements and not to display a new element until a displayed element is checked and corrected. This enables the form checker to recognize which element to be corrected if it is found that the content of an element having a predetermined dependency relationship with another element does not satisfy this relationship.

A calculation expression used in this exemplary embodiment is not restricted to an expression defined by mathematical operators, and may be an expression calculated by using a learning model into which a dependency target element is input. For example, the content of an element for which the collation type is "calculate" is determined by using a learning model subjected to machine learning into which the content of a dependency target element is input. Such a mode is also an example of the calculation expression.

A specific example of such a mode will be explained. At a hospital, for example, a patient inputs its symptom, such as having a sore throat and having joints pain, into a medical interview sheet as a form, and a doctor estimates the name of the patient's disease from the symptom and writes it down in the form. This form is then subjected to OCR processing. By using the OCR result, learning is conducted to estimate the name of a disease from a symptom, thereby producing a learning model. By inputting a symptom into this learning model, the name of a disease is estimated.

If the name of a disease estimated by using the learning model is different from that written by a doctor in a form, the doctor may be suggested reconsidering the name of the disease.

Additionally, in the above-described exemplary embodiment, the dependency relationship concerning an element of a "calculate" item is expressed by a calculation expression. However, the dependency relationship is not restricted to a relationship defined by an expression. For example, the range by which the content of an element covers may be restricted by the content of another element. The relationship between these elements is also included in the dependency relationship in the exemplary embodiment.

FIG. 18 illustrates a checking/correcting screen 33 for explaining such a dependency relationship. In the form image region 34 on the checking/correcting screen 33, part of the image of a medical interview sheet filled by a patient at a hospital, for example, is displayed.

The medial interview sheet includes a symptom field and a details field. The patient selects one of the options prepared in the symptom field and writes details of the selected symptom into the details field by hand.

It is assumed that, on the form designing screen 30, the collation type "input" is set in the symptom field and the collation type "calculate" is set in the details field. In the details field, the dependency relationship for each of the options prepared in the symptom field is set instead of a calculation expression. For example, if the "physically tired" option is selected as the symptom, a part of the body where the patient feels tired is supposed to be input into the details field. In the details field, the dependency relationship between this symptom option and parts of the body is set.

If the "physically tired" option is selected as the symptom and if "eye" is written in the details field, the CPU 41 determines that the dependency relationship between the content of the symptom and that of the details is satisfied, and does not display any suggestion to correct the content of the details on the checking/correcting screen 33.

In contrast, if the "physically tired" option is selected as the symptom and if "having trouble falling asleep" is input in the details field, the content of the details field does not match the content that can be estimated from the dependency relationship. That is, the dependency relationship between the symptom and the details is not satisfied. The CPU 41 thus displays an icon in the checking field of the checking/correcting region 35 on the checking/correcting screen 33 to attract the checker's attention and instruct it to check the content in the details field, as shown in FIG. 19. The CPU 41 may also display the probable cause of an error concerning the dependency relationship, such as "User may have input wrong details", in the checking/correcting region 35.

For the "do not sleep well (insomnia)" option as the symptom, the situations of the insomnia, such as "having trouble falling asleep" and "waking at many times in the middle of the night", are associated with this option in the details field as the dependency relationship.

The relationship between the above-described elements (symptom and details), that is, the relationship in which the content of one element input in a form is linked with that of another element in the form in accordance with the content of this element, is also an example of the dependency relationship.

The present disclosure has been discussed through illustration of the exemplary embodiment. However, the disclosure is not restricted to the technical range of the above-described exemplary embodiment. Various modifications and/or improvements may be made to the exemplary embodiment without departing from the spirit and scope of the disclosure. Exemplary embodiments obtained by making modifications and/or improvements are also encompassed within the technical range of the disclosure. For example, the order of operations may be changed without departing from the spirit and scope of the disclosure.

In the above-described exemplary embodiment, the processing operations are implemented by software by way of example. However, operations equivalent to those shown in the flowcharts of FIGS. 10, 12, 14, and 16 may be implemented by using hardware, such as an application specific integrated circuit (ASIC). In this case, operations are executed faster than using software.

Although the information processing program is installed in the ROM in the above-described exemplary embodiment, it may be provided in a different manner. For example, the information processing program may be provided as a result of being recorded in a computer-readable storage medium in an optical disc, such as a compact disc (CD)-ROM or a digital versatile disc (DVD)-ROM, or in a semiconductor memory.

The information processing apparatus 10 may obtain the information processing program via the communication network 2 from an external device connected to the communication network 2.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus, comprising:
   a first display controller configured to perform control to display a first character recognition result of a first element, the first element and a second element being contents of a form and having a specific dependency relationship;
   a receiver configured to receive a checking/correcting result of the first character recognition result from a user; and
   a second display controller configured to:
      perform control to display information that the checking/correcting result and a second character recognition result do not satisfy the dependency relationship, the second character recognition result being a character recognition result of the second element;
      perform control to display a first suggestion that the second element is wrong if a recognition accuracy degree of the second character recognition result is higher than a predetermined reference value; and
      perform control to display a second suggestion that the second character recognition result is wrong if the recognition accuracy degree is not higher than the predetermined reference value.

2. The information processing apparatus according to claim 1, wherein the second display controller is configured to perform control to display a suggestion that a user who filled the form forgot to fill the second element if the checking/correcting result and the second character recognition result do not satisfy the dependency relationship and if the second element is left blank.

3. The information processing apparatus according to claim 1, wherein the second display controller is configured to perform control to display content of the second element estimated from the first character recognition result.

4. The information processing apparatus according to claim 1, wherein the dependency relationship is a relationship representing that the first element is a variable in a calculation expression forming the second element.

5. The information processing apparatus according to claim 1, wherein the dependency relationship is a relationship representing that content of the second element is linked with content of the first element in advance in accordance with the content of the first element.

6. The information processing apparatus according to claim 1, wherein the receiver is configured to receive selection of the first and second elements, the information processing apparatus further comprising:
   a setter configured to set a dependency relationship between the selected first and second elements received by the receiver.

7. The information processing apparatus according to claim 1, further comprising:
   a receiving controller configured to perform control so that checking and/or correcting of the second character recognition result is not received until a checking/correcting result of checking and/or correcting the first character recognition result is received from a checker.

8. A non-transitory computer readable medium storing a program causing a computer to execute a process, the process comprising:
   performing control to display a first character recognition result, the first character recognition result being a character recognition result of a first element, the first element and a second element being contents of a form and having a specific dependency relationship;
   receiving a checking/correcting result of the first character recognition result from a user;
   performing control to display information that the checking/correcting result and a second character recognition result do not satisfy the dependency relationship, the second character recognition result being a character recognition result of the second element;
   performing control to display a first suggestion that the second element is wrong if a recognition accuracy degree of the second character recognition result is higher than a predetermined reference value; and performing control to display a second suggestion that the second character recognition result is wrong if the recognition accuracy degree is not higher than the predetermined reference value.

9. An information processing apparatus, comprising:

first display control means for performing control to display a first character recognition result, the first character recognition result being a character recognition result of a first element, the first element and a second element having a specific dependency relationship and being included in a form;

receiving means for receiving a checking/correcting result of checking and/or correcting the first character recognition result; and second display control means for:
  performing control to display information that the checking/correcting result and a second character recognition result do not satisfy the dependency relationship, the second character recognition result being a character recognition result of the second element;
  performing control to display a first suggestion that the second element is wrong if a recognition accuracy degree of the second character recognition result is higher than a predetermined reference value; and
  performing control to display a second suggestion that the second character recognition result is wrong if the recognition accuracy degree is not higher than the predetermined reference value.

\* \* \* \* \*